(12) United States Patent
Cotter et al.

(10) Patent No.: US 11,090,977 B2
(45) Date of Patent: Aug. 17, 2021

(54) WHEEL HUB ASSEMBLY

(71) Applicant: HAYES BICYCLE GROUP INC., Mequon, WI (US)

(72) Inventors: Shawn T Cotter, Grafton, WI (US); John Cory, Minocqua, WI (US)

(73) Assignee: Hayes Bicycle Group Inc., Mequon, WI (US)

( * ) Notice: Subject to any disclaimer, the term of this patent is extended or adjusted under 35 U.S.C. 154(b) by 153 days.

(21) Appl. No.: 16/449,439

(22) Filed: Jun. 23, 2019

(65) Prior Publication Data

US 2020/0009907 A1    Jan. 9, 2020

Related U.S. Application Data

(60) Provisional application No. 62/694,897, filed on Jul. 6, 2018.

(51) Int. Cl.
| | | |
|---|---|---|
| *B60B 27/02* | (2006.01) | |
| *B60B 27/04* | (2006.01) | |
| *F16D 41/30* | (2006.01) | |

(52) U.S. Cl.
CPC .......... *B60B 27/023* (2013.01); *B60B 27/047* (2013.01); *F16D 41/30* (2013.01)

(58) Field of Classification Search
None
See application file for complete search history.

(56) References Cited

U.S. PATENT DOCUMENTS 7,726,454 B2 * 6/2010 French .................. B60B 27/047
                                                               192/64
8,443,951 B1    5/2013 Hsieh

FOREIGN PATENT DOCUMENTS

EP    1872971    10/2008
EP    2770224    1/2018
(Continued)

OTHER PUBLICATIONS

English translation of Taiwan Patent Document TW163591.

*Primary Examiner* — Colby M Hansen
(74) *Attorney, Agent, or Firm* — Zimmerman Intellectual Property Services LLC

(57) ABSTRACT

A wheel hub assembly for a bicycle is disclosed. The wheel hub assembly may comprise a hub shell for a wheel and coupled to a hub body with an axle by a ratchet mechanism and configured to provide an engaged state where the hub body/axle and the hub shell/wheel rotate together and a disengaged state where the hub body/axle may rotate independently relative to hub shell/wheel; the ratchet mechanism may comprise a set of ratchet rings configured with a set of teeth and sets/groups of pawls configured to engage/disengage the teeth of a ratchet ring; ratchet rings may be configured/installed in the hub body in an aligned condition or an offset condition; when ratchet rings are configured in an offset condition the ratchet mechanism may be configured to facilitate a generally more responsive transition between the disengaged state and the engaged state for the hub body/axle and hub shell/wheel. The wheel hub assembly may comprise a hub shell/wheel and a free hub body/axle coupled by a ratchet mechanism comprising at least one ratchet ring with gear teeth configured to engage a corresponding set/group of pawls so that the wheel and hub body/axle may engage in a power-transmission state such as for forward driven movement; the ratchet mechanism with ratchet rings/pawls may disengage in a free-wheel state. The ratchet mechanism may comprise a ratchet ring arrangement with multiple sets of ratchet rings; with each ratchet ring in offset the number of effective gear teeth per cycle of rotation of the ratchet ring arrangement is greater than the number of gear teeth on each separate ratchet ring; the number of (Continued)

effective gear teeth able to be engaged (e.g. by pawls having a shape/profile to engage from one direction and disengage from one direction with gear teeth during rotation) provides variation of performance characteristics for the wheel hub assembly. A configuration with fewer effective gear teeth may allow for larger gears and greater durability/strength; a configuration with multiple pawls/pawl sets may allow for wider load distribution within the ratchet mechanism; a configuration with multiple offset ratchet rings may allow for improved responsiveness (e.g. within fewer degrees of rotation); a configuration with multiple aligned ratchet rings may allow for greater durability/strength and wider load distribution within the ratchet mechanism. The ratchet mechanism of the wheel hub assembly may be configured for a wide variety of applications, including road biking, mountain biking, electronic bikes. The wheel hub assembly is provided in a compact form/design to allow configuration in a variety of arrangements which can accommodated a variety of different ratchet mechanism configurations (e.g. ratchet ring/pawl combinations).

20 Claims, 12 Drawing Sheets

(56) References Cited

FOREIGN PATENT DOCUMENTS

| TW | 1549837 | 9/2016 |
| TW | 1635971 | 9/2018 |

* cited by examiner

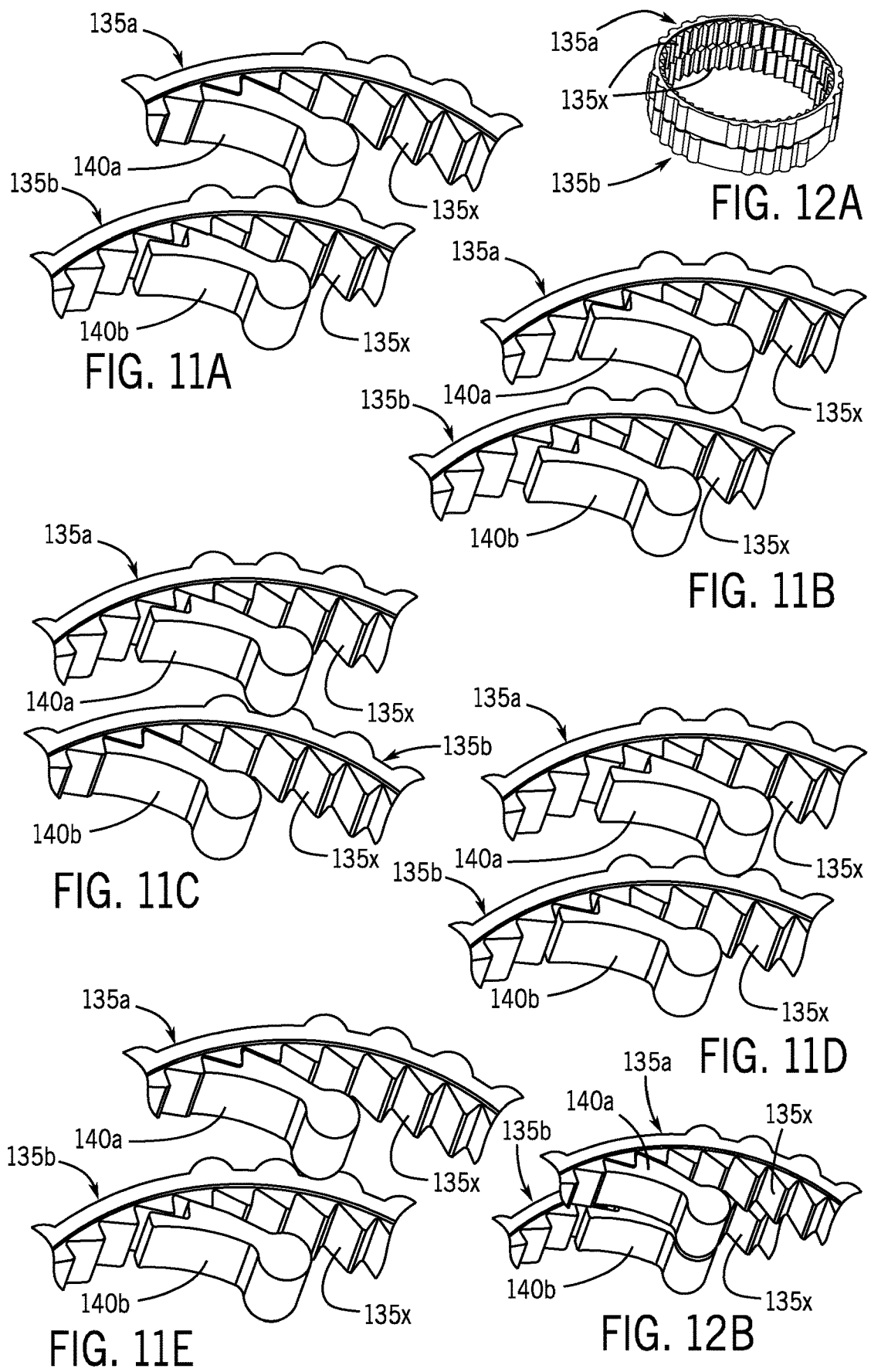

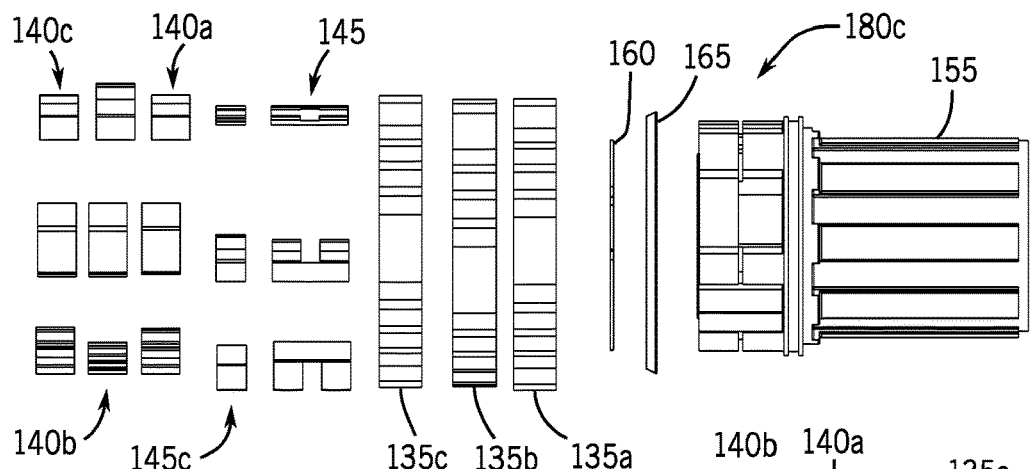
FIG. 14
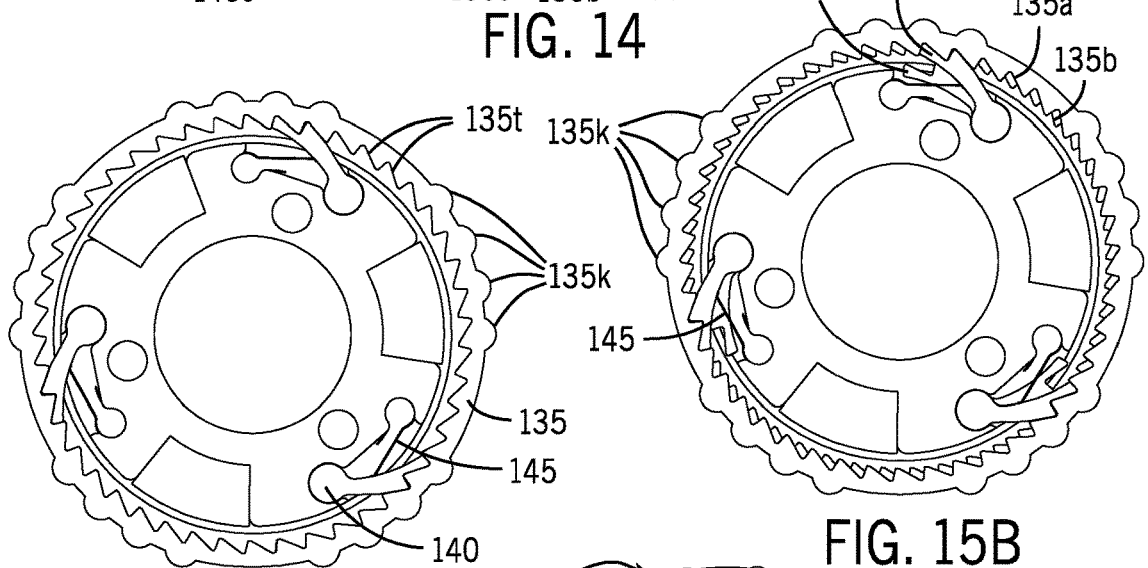
FIG. 15A
FIG. 15B
FIG. 16A
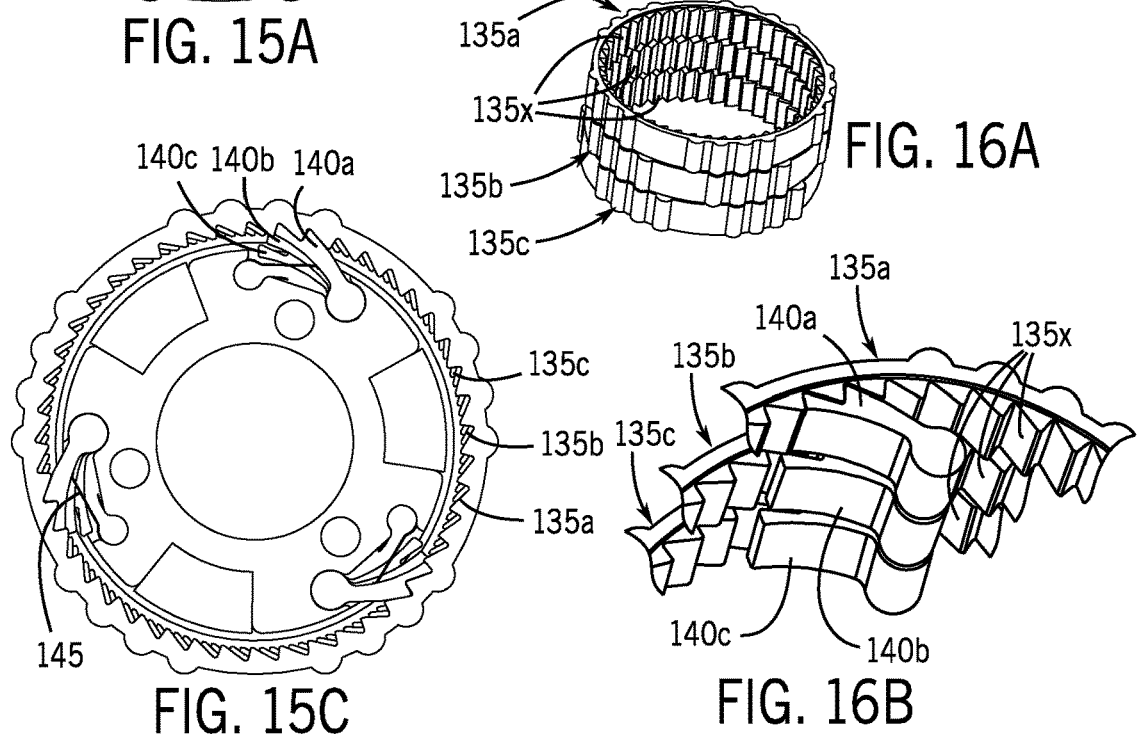
FIG. 15C
FIG. 16B

WHEEL HUB ASSEMBLY

CROSS-REFERENCE TO RELATED APPLICATIONS

The present application is a non-provisional application of U.S. Provisional Patent Application No. 62/694,897 titled "WHEEL HUB ASSEMBLY" filed Jul. 6, 2018.

The present application claims priority to and incorporates by reference in full the following patent application: U.S. Provisional Patent Application No. 62/694,897 titled "WHEEL HUB ASSEMBLY" filed Jul. 6, 2018.

FIELD

The present invention relates to a wheel hub assembly for a bicycle.

BACKGROUND

It is known to provide a wheel hub assembly for a bicycle to engage and couple the rear wheel to a drive system (such as pedals configured to transmit power) in a forward direction (e.g. for forward motion) and to disengage and decouple the drive system and the wheel and to allow free rotary motion/rotation relative to the wheel other than in the forward direction (e.g. gliding, coasting or "free-wheeling" or etc.). In typical use the operator/rider of such a bicycle may not infrequently transition the rear wheel/wheel hub assembly between the engaged state (e.g. while pedaling/applying power) and the disengaged/free-wheel state (e.g. while coasting, slowing, braking/stopped, shifting, etc.).

It would be advantageous to provide an improved wheel hub assembly that is configured to transition quickly and efficiently between the disengaged state and engaged state, including responsively and rapidly when intended.

It would be advantageous to provide an improved wheel hub assembly that is configured to facilitate improved performance including enhanced responsiveness in transitions between engagement and disengagement and/or improved durability in application/use, including for road biking, mountain biking, electronic bikes (e.g. with motor-driven drive systems), etc.

It would be advantageous to provide an improved configuration for a wheel hub assembly that can be produced in a compact structure/form and that by design provides the capability for improved performance in application/use.

SUMMARY

The present invention relates to an improved wheel hub assembly for a bicycle.

The present invention relates to an improved wheel hub assembly that is configured to transition quickly and efficiently between the disengaged state and engaged state, including responsively and rapidly when intended.

The present invention relates to an improved wheel hub assembly that is configured to facilitate improved performance including enhanced responsiveness in transitions between engagement and disengagement and/or improved durability in application/use, including for road biking, mountain biking, electronic bikes (e.g. with motor-driven drive systems), etc.

The present invention relates to an improved configuration for a wheel hub assembly that can be produced in a compact structure/form and that by design provides the capability for improved performance in application/use.

The present invention relates to a hub assembly for a wheel comprising a hub shell coupled to the wheel and a hub body configured for an axle; the hub shell is coupled to the hub body by a ratchet mechanism; the ratchet mechanism may comprise a ratchet ring arrangement and a pawl system; rotation of the hub shell may comprise (a) rotation with engagement with the hub body when the pawl system is engaged with the ratchet ring arrangement and (b) rotation without engagement with the hub body when the pawl system is disengaged from the ratchet ring arrangement; and maximum rotation of the hub shell before engagement of the hub body is a configured to be determined by at least one of (a) a number of ratchet rings in the ratchet ring arrangement; (b) a number of gear teeth of each ratchet ring of the ratchet ring arrangement; (c) whether gear teeth of each ratchet ring of the ratchet ring arrangement are in an aligned condition or an offset condition; (d) a number of sets of pawls of the pawl system for engagement with a gear teeth of a ratchet ring in the ratchet ring arrangement. The pawl system may comprise multiple sets of pawls configured to engage the ratchet ring arrangement. The pawl system may comprise adjacent sets of pawls configured in an aligned condition for engagement with the ratchet ring arrangement. The ratchet ring arrangement may comprise adjacent ratchet rings configured for engagement with the pawl system; the ratchet ring arrangement is in the aligned condition when gear teeth of adjacent ratchet rings of the ratchet ring arrangement are in alignment; the ratchet ring arrangement is in the offset condition when gear teeth of adjacent ratchet rings of the ratchet ring arrangement are offset. In the offset condition maximum rotation before engagement of the hub shell with the hub body is reduced in comparison with the aligned condition. The ratchet ring arrangement may comprise multiple sets of ratchet rings; with each ratchet ring in an offset condition a number of effective gear teeth per cycle of rotation of each ratchet ring arrangement is greater than the number of gear teeth of each ratchet ring; variation of the number of effective gear teeth engaged provides variation of performance characteristics at the wheel. Each of the multiple sets of ratchet rings may be configured to engage a set of pawls of the pawl system.

The present invention relates to a hub assembly for a wheel comprising a hub shell coupled to the wheel and a hub body configured for an axle; the hub shell is coupled to the hub body by a ratchet mechanism; the ratchet mechanism is configured to provide an engaged state where the hub body with the axle is configured to rotate together with the hub shell with the wheel; the ratchet mechanism is configured to provide a disengaged state where the hub body with the axle is configured to rotate independently relative to the hub shell with the wheel; the ratchet mechanism may comprise a set of pawls and a set of ratchet rings comprising a set of teeth; in the engaged state for a ratchet ring a set of teeth is configured to engage a set of pawls; the engaged state may comprise a power-transmission state configured for transmission of power to the wheel; and the disengaged state may comprise a free-wheel state. The set of ratchet rings may be configured to be installed in the hub body in an aligned condition or an offset condition. When the ratchet rings are configured in an offset condition the ratchet mechanism may be configured to facilitate a generally more responsive transition between the disengaged state and the engaged state. The set of ratchet rings may comprise multiple sets of ratchet rings; with each ratchet ring in the set of ratchet rings in a offset condition a number of effective gear teeth per cycle of rotation of each ratchet ring arrangement is greater than the number of gear teeth on each separate ratchet ring.

The present invention relates to a hub assembly for a wheel comprising a hub shell coupled to the wheel a hub body configured for an axle; the hub shell may be coupled to the hub body by a ratchet mechanism; the ratchet mechanism may comprise a ratchet ring system and a pawl system; the pawl system may be configured for engagement with the ratchet ring system; rotation of the hub shell may comprise (a) rotation with engagement with the hub body and (b) rotation without engagement with the hub body. The ratchet ring system may comprise adjacent ratchet rings configured for engagement with the pawl system; the ratchet ring system is in an aligned condition when gear teeth of adjacent ratchet rings of the ratchet ring system are in alignment; the ratchet ring system is in an offset condition when gear teeth of adjacent ratchet rings of the ratchet ring system are offset. The ratchet mechanism is in the offset condition maximum rotation before engagement of the hub shell with the hub body is reduced in comparison with the aligned condition. In the aligned condition wider load distribution within the ratchet mechanism is enhanced in comparison with the offset condition. The pawl system may comprise a number of sets of pawls for engagement with a ratchet ring of the ratchet ring system. Rotation of the hub shell may comprise (a) rotation with engagement with the hub body when the pawl system is engaged with the ratchet ring system and (b) rotation without engagement with the hub body when the pawl system is disengaged from the ratchet ring system. Maximum rotation of the hub shell before engagement of the hub body is a product of at least one of (a) a number of ratchet rings; (b) a number of gear teeth of each ratchet ring; (c) whether gear teeth of each ratchet ring are in an aligned condition or an offset condition; (d) a number of sets of pawls for engagement with a gear teeth of a ratchet ring. The ratchet mechanism may comprise an interface between the hub shell and the hub body; the interface is configured for an engaged state and a disengaged state; the interface is configured for maximum rotation between the disengaged state and the engaged state; in the engaged state a set of ratchet rings of the ratchet ring system is engaged with a set of pawls of the pawl system. The interface may comprise the profile of pawls of the pawl system for engagement with the ratchet ring system. The interface may comprise a number of sets of pawls for engagement with gear teeth within the ratchet mechanism. The interface may comprise mating surfaces of a ratchet ring of the ratchet mechanism with an inner surface of the hub shell.

The present invention relates to an improved wheel hub assembly that may comprise a hub shell for a wheel and coupled to a hub body with an axle by a ratchet mechanism and configured to provide an engaged state where the hub body/axle and the hub shell/wheel rotate together and a disengaged state where the hub body/axle may rotate independently relative to hub shell/wheel; the ratchet mechanism may comprise a set of ratchet rings configured with a set of teeth and a sets/groups of pawls configured to engage/disengage the teeth of a ratchet ring; the ratchet rings may be configured/installed in the hub body in an aligned condition or an offset condition; when the ratchet rings are configured in an offset condition the ratchet mechanism may be configured to facilitate a generally more responsive transition between the disengaged state and the engaged state for the hub body/axle and hub shell/wheel.

FIGURES

FIGS. 11A through 11E are schematic fragmentary perspective views of operation of the ratchet mechanism of a wheel hub assembly for a wheel according to an exemplary embodiment.

FIG. 12A is a schematic perspective view of a set of ratchet rings of a wheel hub assembly for a wheel according to an exemplary embodiment.

FIG. 12B is a schematic fragmentary perspective view of a ratchet mechanism for a wheel hub assembly for a wheel according to an exemplary embodiment.

FIG. 14 is a schematic exploded side elevation view of the ratchet mechanism of a wheel hub assembly for a wheel according to an exemplary embodiment.

FIGS. 15A through 15C are schematic diagrams of operation of the ratchet mechanism of a wheel hub assembly for a wheel according to an exemplary embodiment.

FIG. 16A is a schematic perspective view of a set of ratchet rings of a wheel hub assembly for a wheel according to an exemplary embodiment.

FIG. 16B is a schematic fragmentary perspective view of a ratchet mechanism for a wheel hub assembly for a wheel according to an exemplary embodiment.

TABLES

TABLE A is a reference list of example configurations for a ratchet mechanism of a wheel hub assembly according to an exemplary embodiment.

DESCRIPTION

Figure 1:
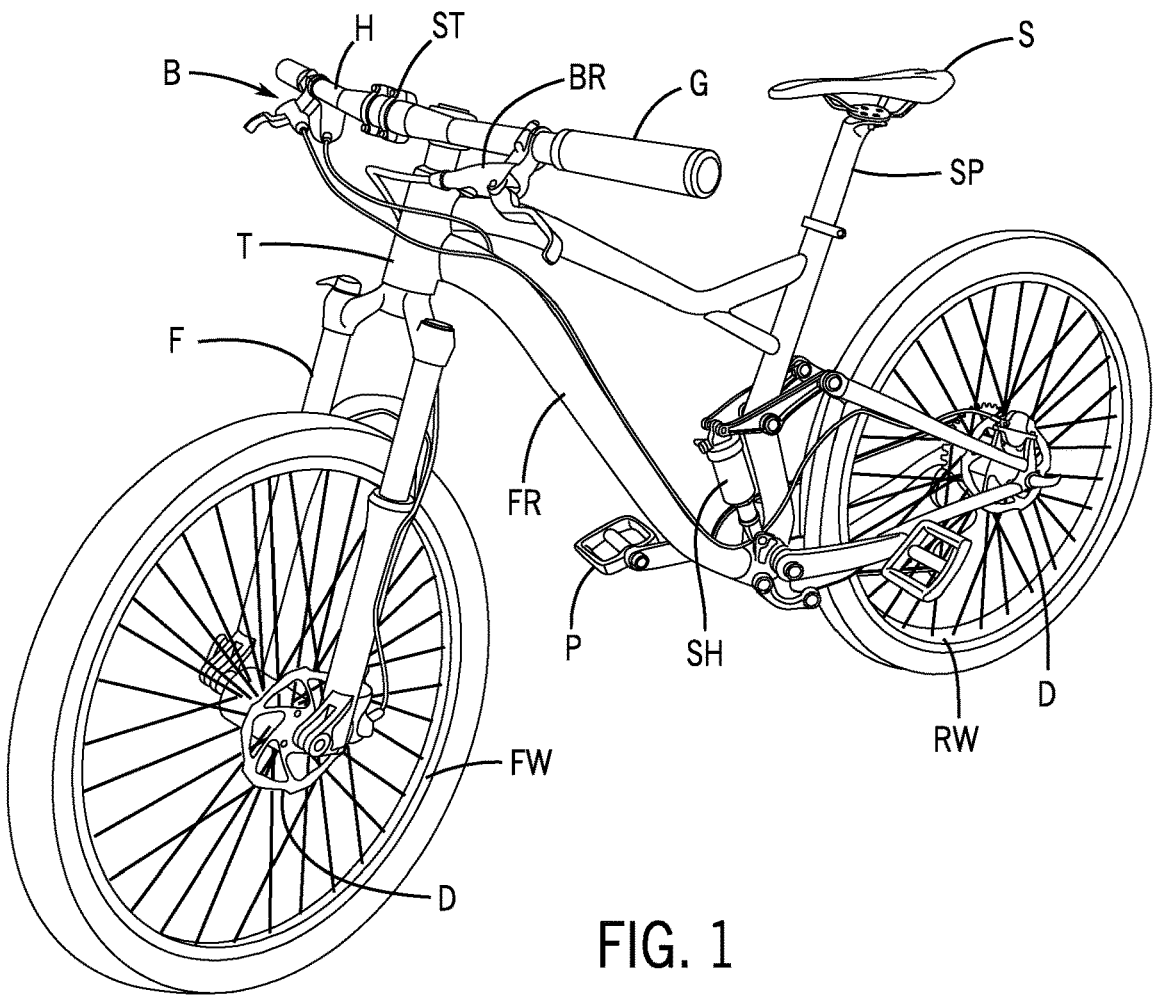
FIG. 1 is a schematic perspective view of a bicycle with a wheel hub assembly according to an exemplary embodiment.

Referring to FIG. 1, a bicycle B (such as a mountain bike) is shown schematically according to an exemplary embodiment providing an arrangement of parts/components including a frame FR with a steering tube T and a seat post SP (with seat S) and a set of wheels comprising front wheel FW with a front fork assembly F and rear wheel RW coupled to the frame FR and through a rear shock absorber SH (of a suspension system) and a set of pedals P; the bicycle provides handlebar H (coupled by stem ST to front wheel FW through front fork assembly F and through steering tube T) with a grip G and controls for a brake system BR coupled to a brake disc D (e.g. rotor at/on each of front wheel FW and rear wheel RW).

As shown schematically according to an exemplary embodiment in FIGS. 1, 2A-2B and 3, the rear wheel RW comprises a wheel hub assembly RH/100; the wheel hub assembly 100 comprises a central tube structure shown as a hub shell 125 configured to provide structure for the wheel (e.g. with interconnection for wheel spokes shown as spoke flange 102 and 103 for securing the wheel rim) and a free hub body 155 with an axle 115 within the hub shell 125; the free hub body 155 and axle 115 are installed and coupled within the hub shell 125 by a ratchet mechanism 180 and configured for connection to the drive system for the bicycle. (As indicated schematically in FIGS. 1 and 2A-2B, the wheel hub assembly may provide for connection to related systems such as the brake system through mounting tabs 101 for the brake disc for the wheel.)

Figure 2A:
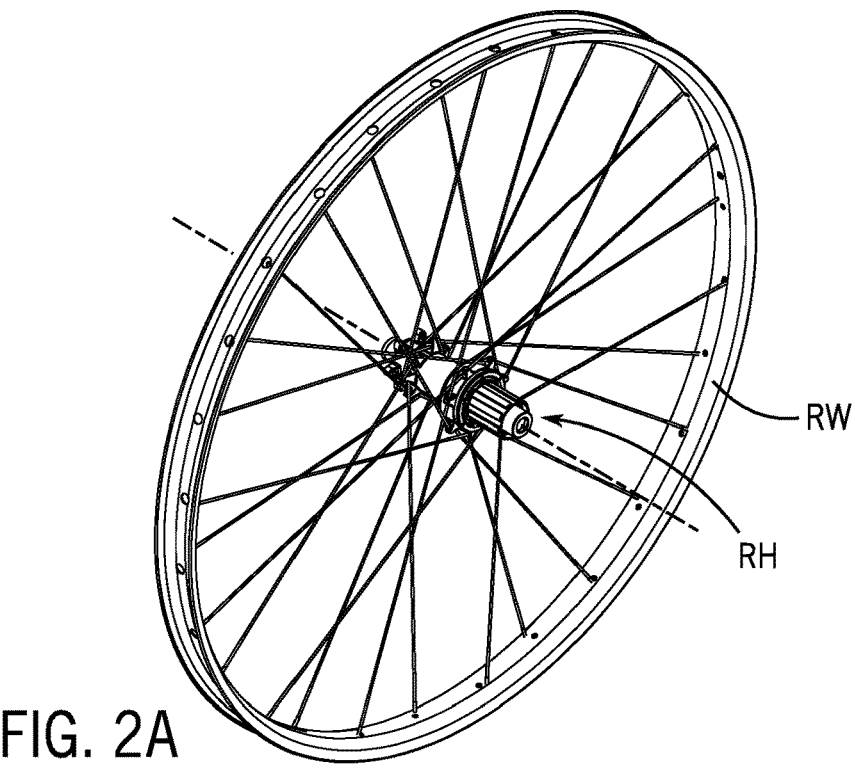
FIG. 2A is a schematic perspective view of a wheel for a vehicle such as a bicycle with a wheel hub assembly according to an exemplary embodiment.
Figure 2B:
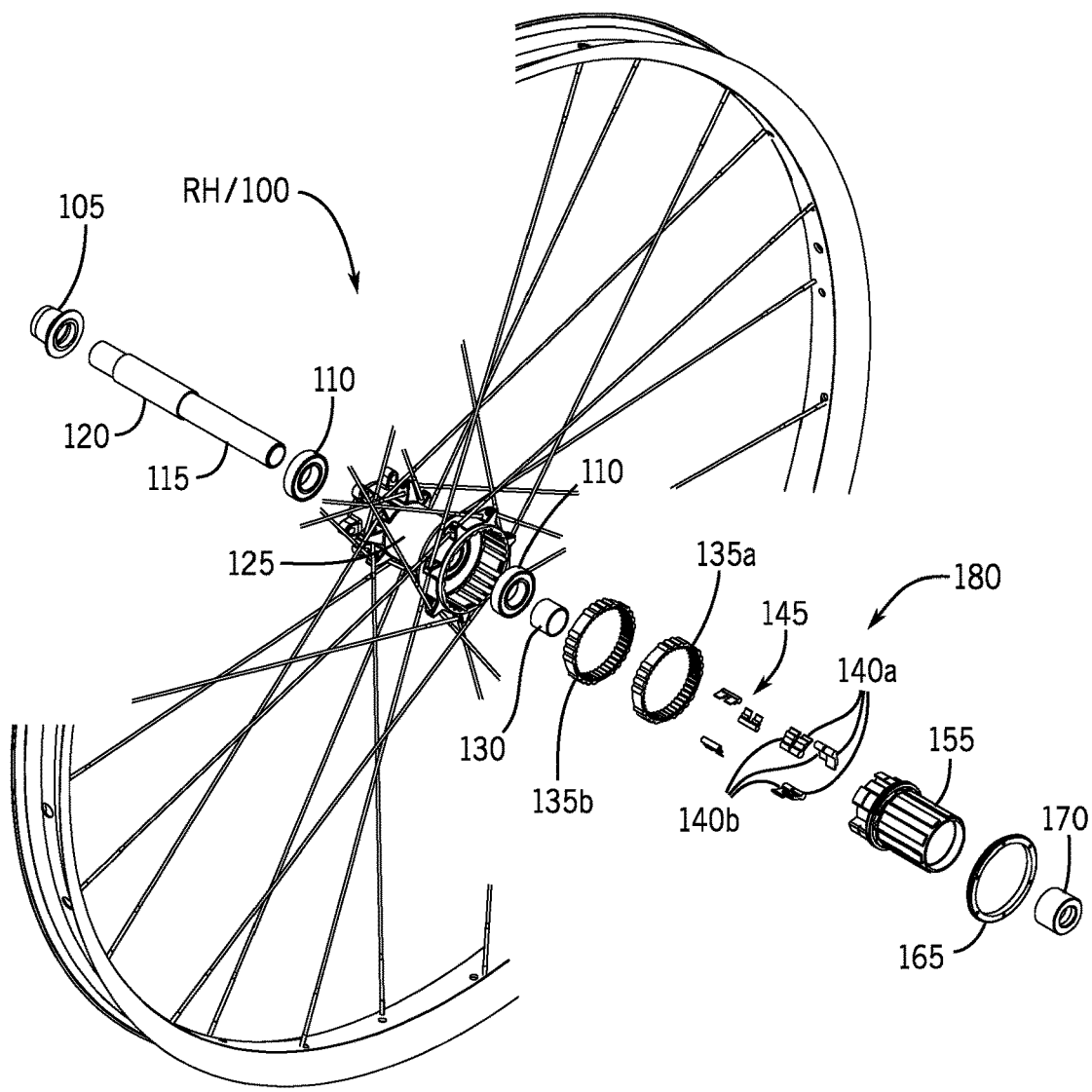
FIG. 2B is a schematic exploded perspective view of wheel hub assembly on a wheel according to an exemplary embodiment.

As shown schematically according to an exemplary embodiment in FIGS. 1 and 2A, wheel hub assembly RH/100 provides wheel hub with a free hub body 155 with axle 115 within the axial center of the rear wheel RW (e.g. configured for rotary motion/rotation about an aligned center axis); the rear wheel/wheel hub assembly are configured for rotation to facilitate forward motion of the bicycle (e.g. with power supplied from a drive system through the free hub body to the rear wheel). As shown schematically according to an exemplary embodiment in FIGS. 1 and 2A-2B, the ratchet mechanism 180 of the wheel hub assembly RH/100 is configured (a) to transmit power in a forward direction from the free hub body/axle for forward motion/rotation of the wheel (e.g. by mechanical engagement/coupling) when the wheel is driven/moved forward (e.g. with power supplied from the drive system (such as gear train/cluster/cassette) to the free hub body/axle such as from an operator through the pedals and/or from a motor, etc.) and (b) to allow free rotary motion/rotation of the free hub body/axle relative to the wheel other than when driven/moved in the forward direction (e.g. by mechanical disengagement/decoupling) when the wheel hub/axle is moved in a reverse direction or with motion slowed/stopped relative to the wheel (e.g. during gliding, coasting, "free-wheeling", braking. slowing, shifting, etc.).

As shown schematically according to an exemplary embodiment in FIGS. 1, 2A-2B and 3, the wheel hub assembly 100 provides an axial structure at the center of the wheel that is on one side/end connected to the drive system and the ratchet mechanism through the free hub body/axle (e.g. providing what is considered to be the "drive side" for components).

Figure 3:
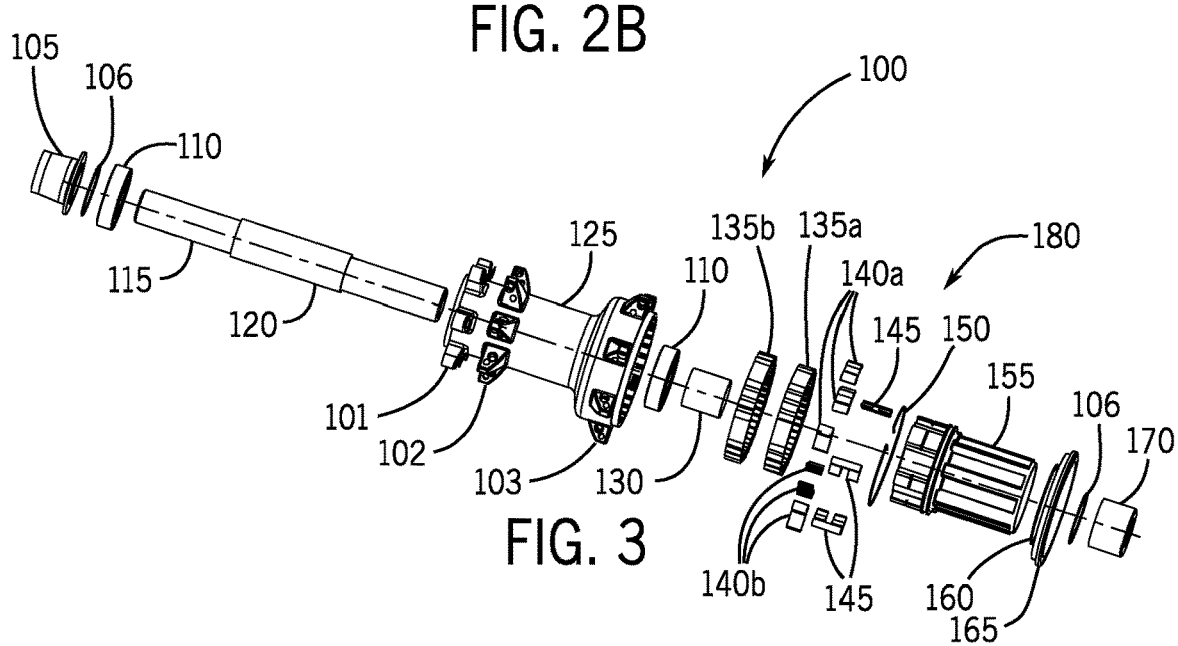
FIG. 3 is a schematic exploded perspective view of a wheel hub assembly for a wheel according to an exemplary embodiment.
Figure 4:
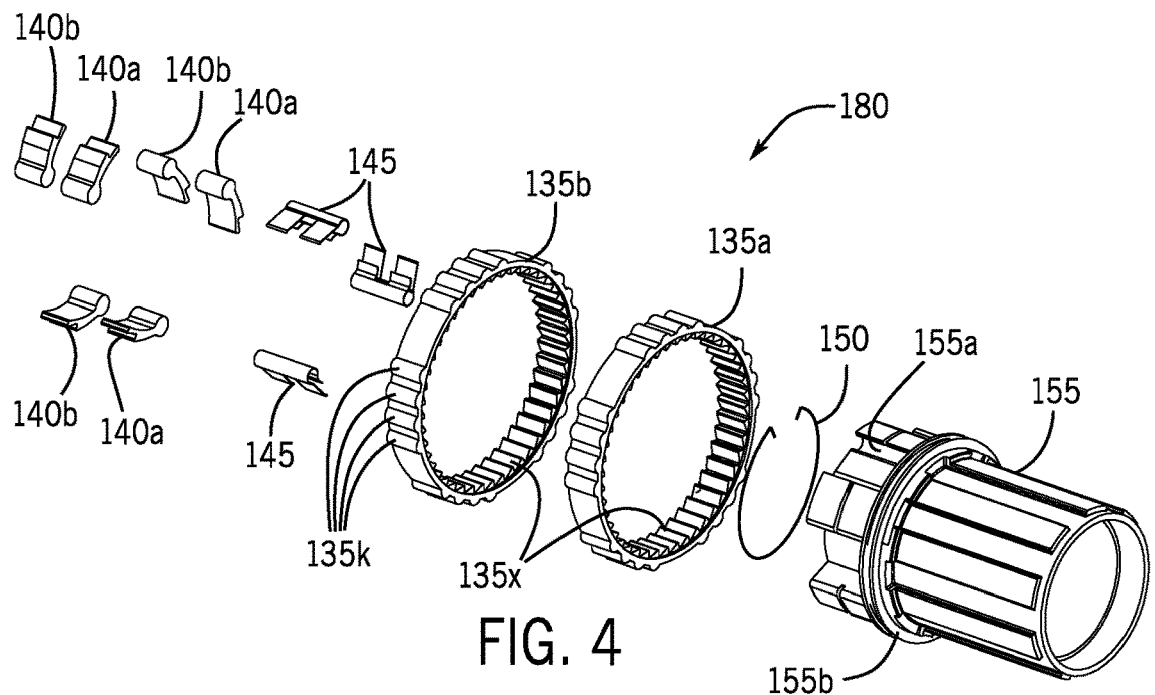
FIG. 4 is a schematic exploded perspective view of a ratchet mechanism for a wheel hub assembly for a wheel according to an exemplary embodiment.
Figure 5:
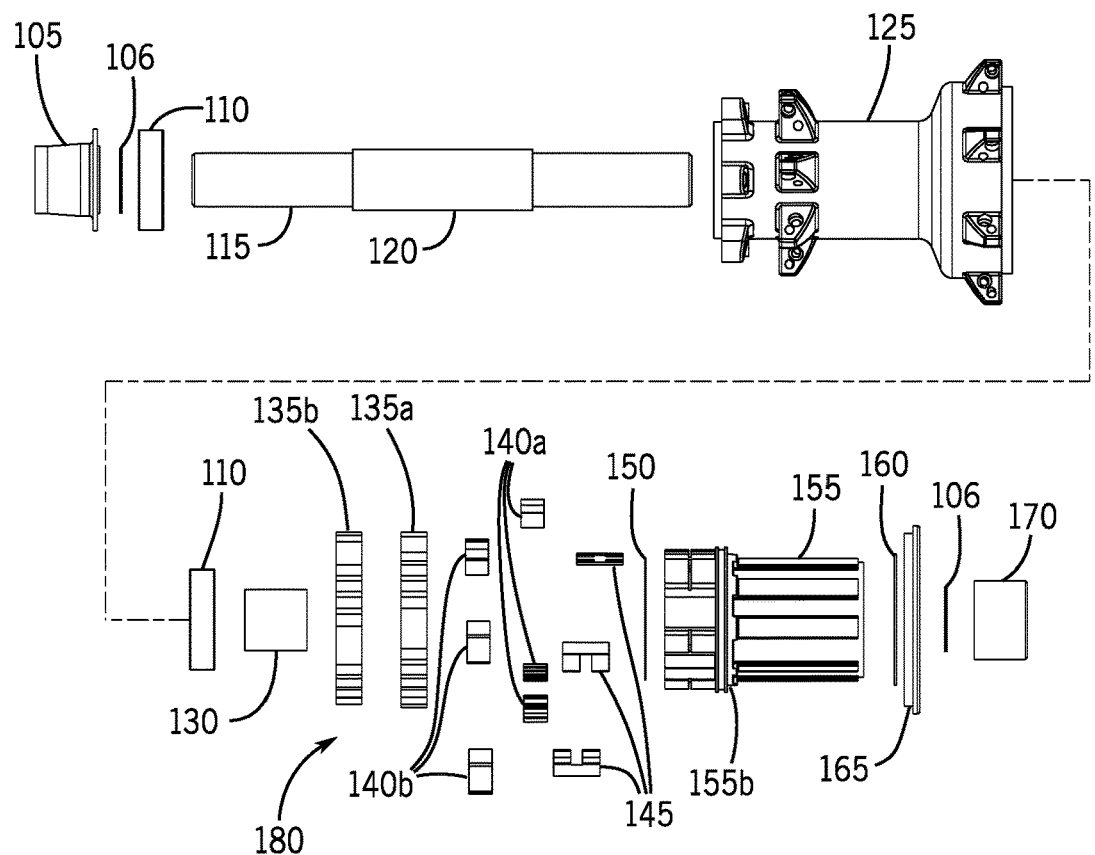
FIG. 5 is a schematic exploded side elevation view of a wheel hub assembly for a wheel according to an exemplary embodiment.
Figure 6:
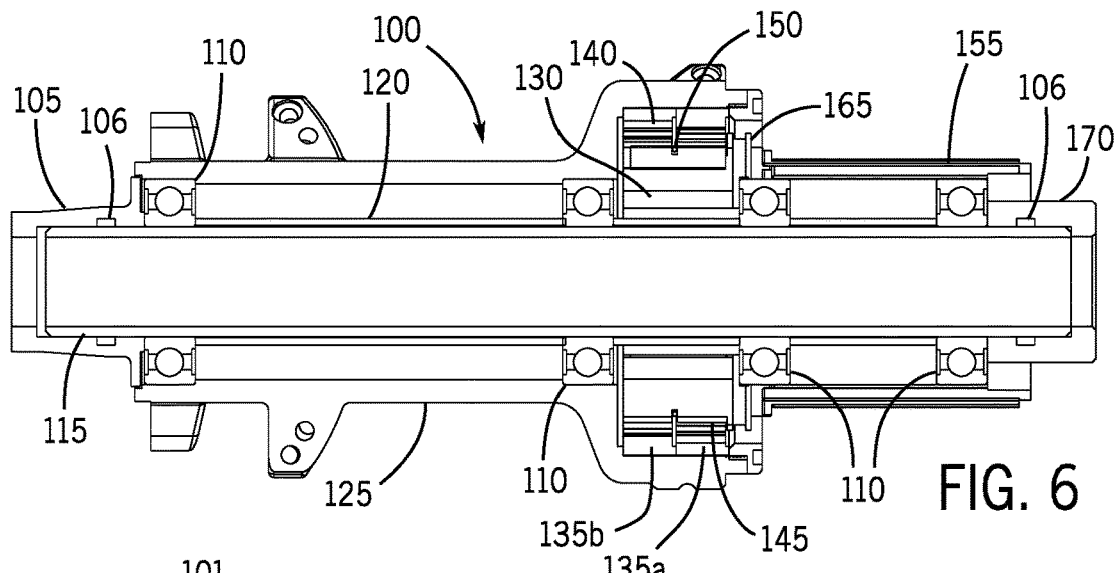
FIG. 6 is a schematic cross-section side elevation view of a wheel hub assembly for a wheel according to an exemplary embodiment.
Figure 7A:
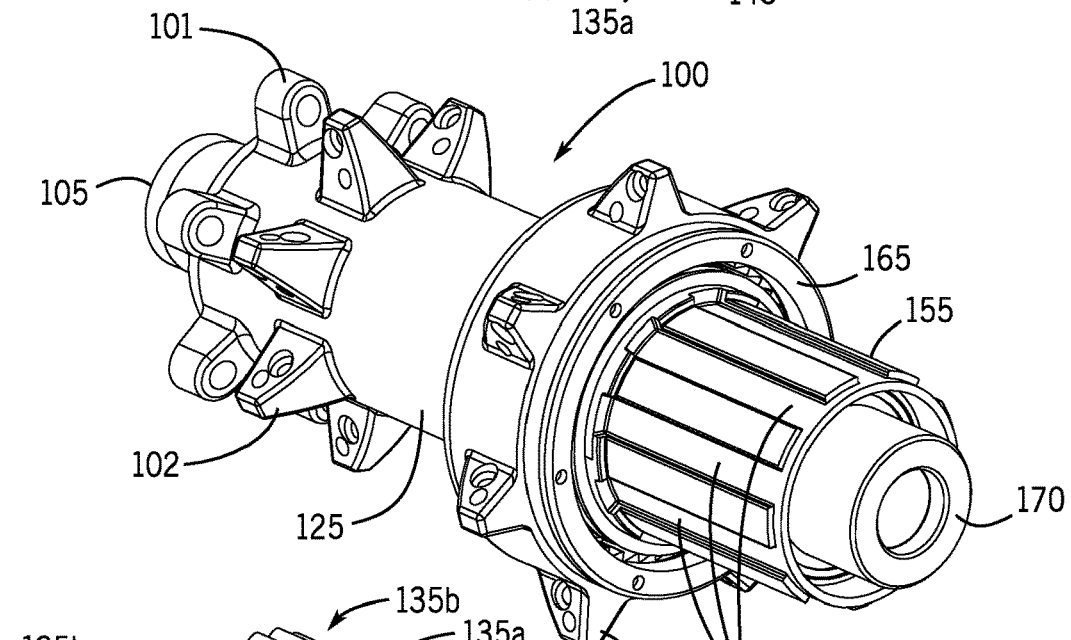
FIG. 7A is a schematic perspective view of a wheel hub assembly for a wheel according to an exemplary embodiment.
Figure 7B:
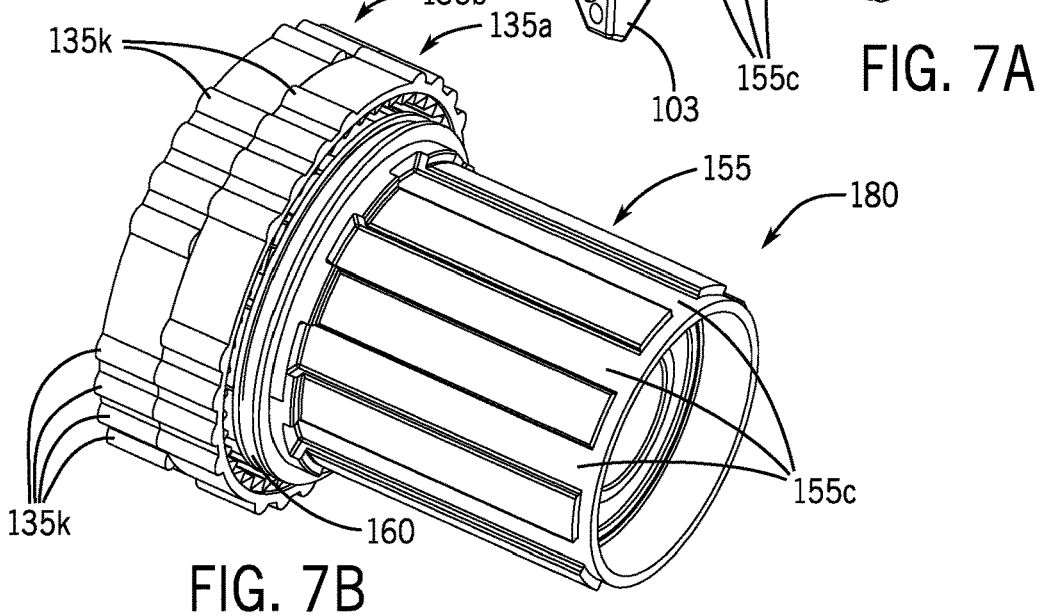
FIG. 7B is a schematic perspective view of a ratchet mechanism for a wheel hub assembly for a wheel according to an exemplary embodiment.
Figure 8A:
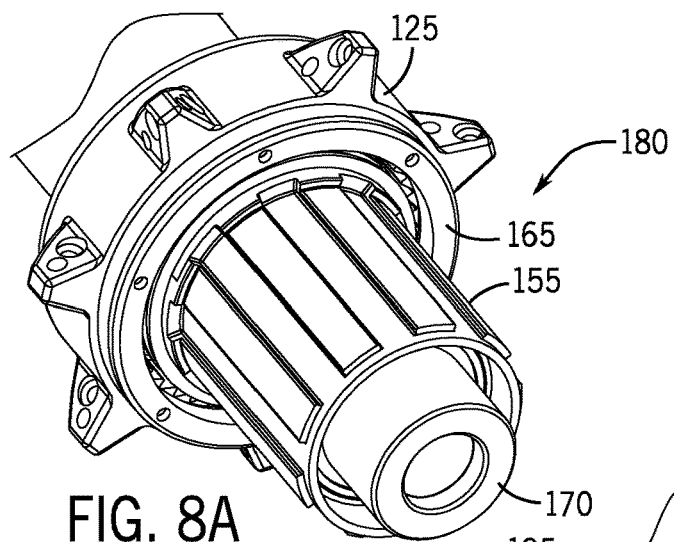
FIGS. 8A through 8D are schematic fragmentary perspective views of a wheel hub assembly for a wheel according to an exemplary embodiment.
Figure 8B:
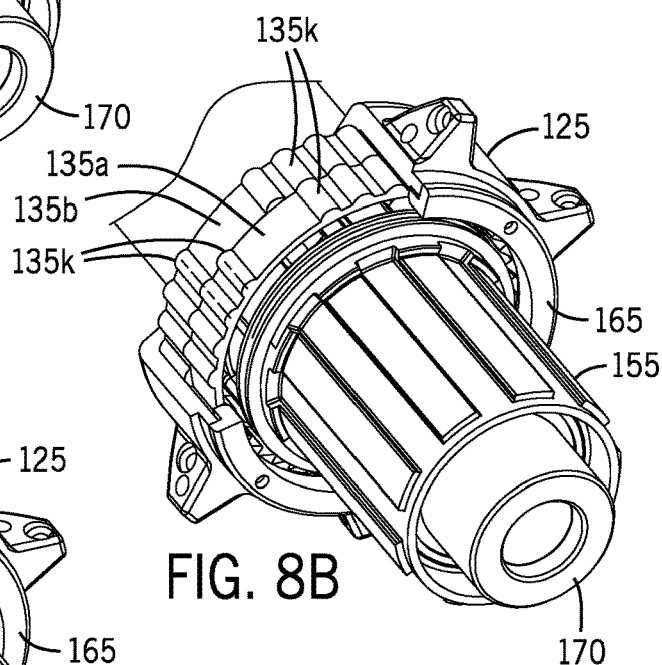
Figure 8C:
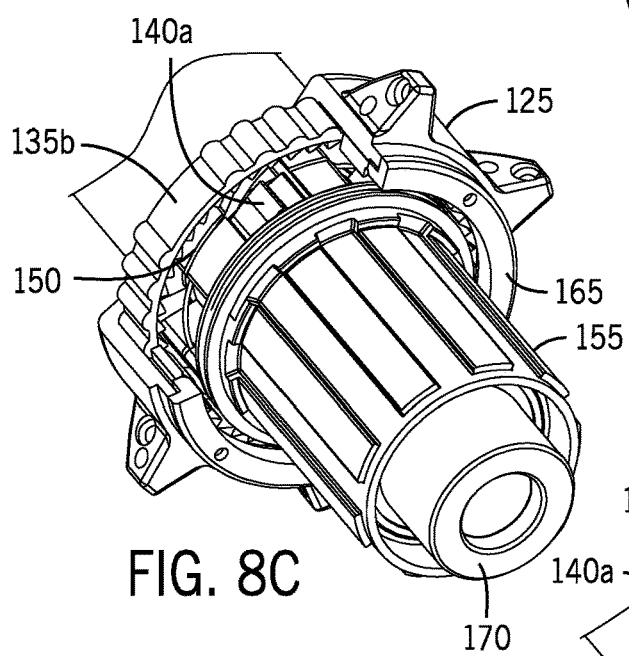
Figure 8D:
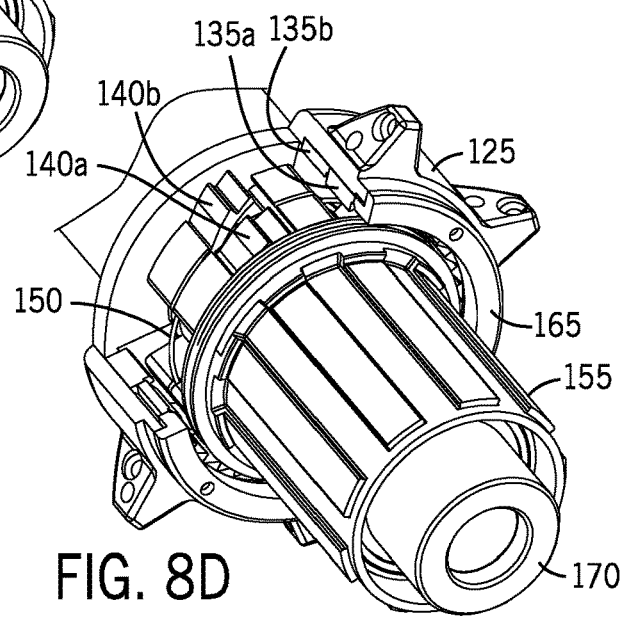

As shown schematically according to an exemplary embodiment in FIGS. 2B, 3, 4, 5, 6 and 7A, the wheel hub assembly 100 comprises a set of end caps comprising end cap 105 (e.g. on non-drive side) an end cap 170 (e.g. on drive side) for the hub shell 125; as shown schematically in FIGS. 3, 5 and 6, the wheel hub assembly 100 is assembled with end cap 105 (non-drive side) and a seal shown as O-ring 106 and a set of bearings 110 an a spacer 120 for the axle 115 for free hub body 155 installed through the ratchet mechanism 180 and within hub shell 125 with a threaded locking ring shown as ratchet cap 165 and an end cap 170 (drive side).

Figure 18A:
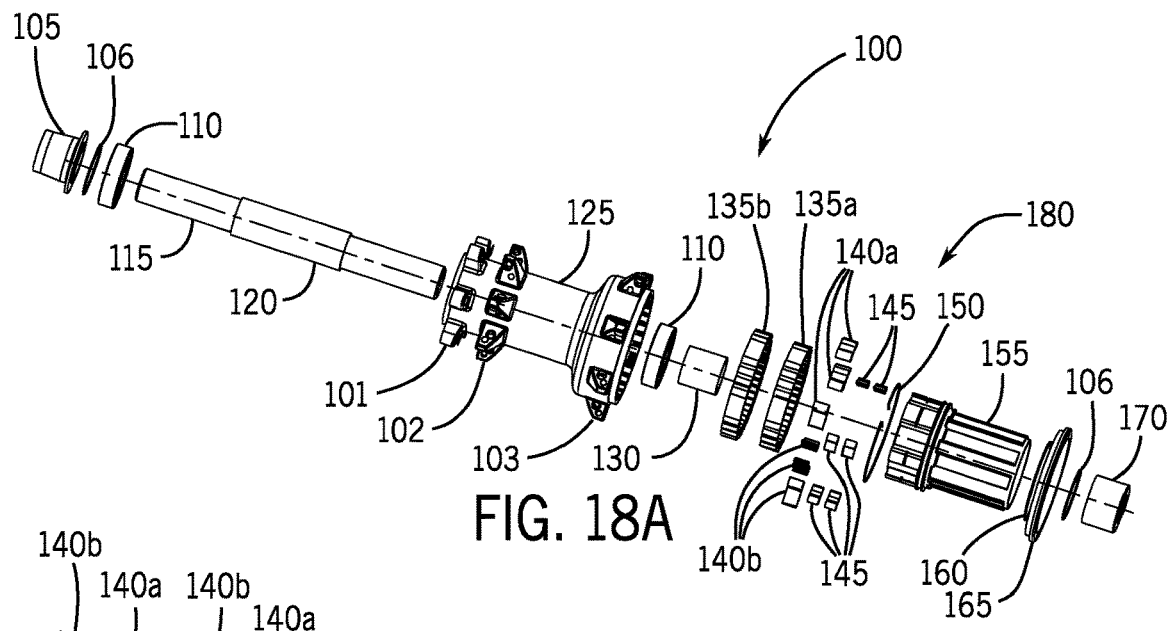
FIG. 18A is a schematic exploded perspective view of a wheel hub assembly for a wheel according to an exemplary embodiment.
Figure 18B:
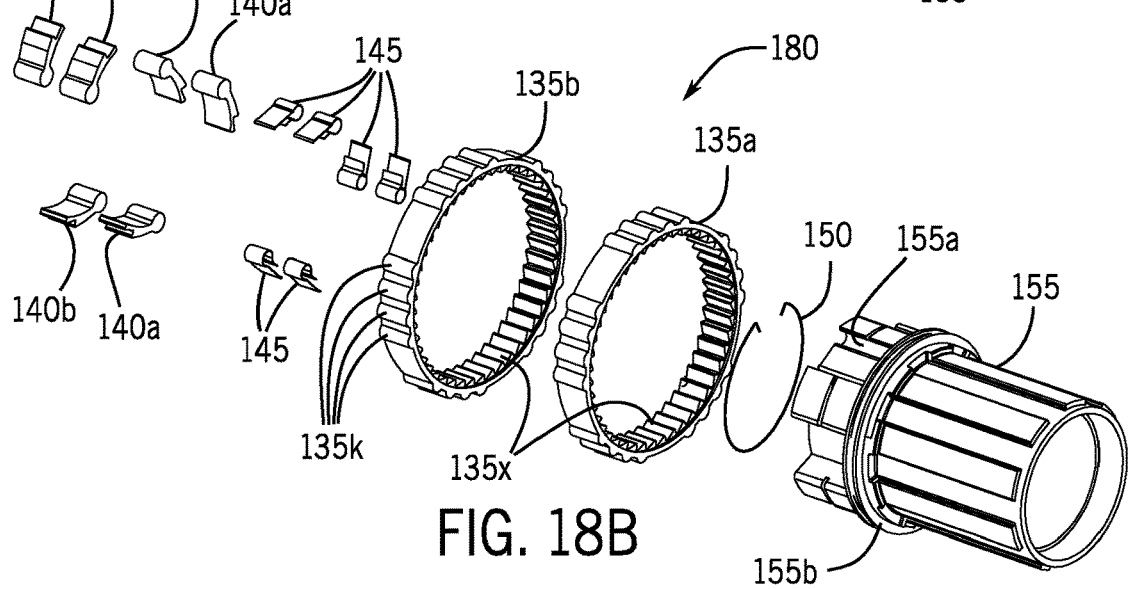
FIG. 18B is a schematic exploded perspective view of a ratchet mechanism for a wheel hub assembly for a wheel according to an exemplary embodiment.
Figure 18C:
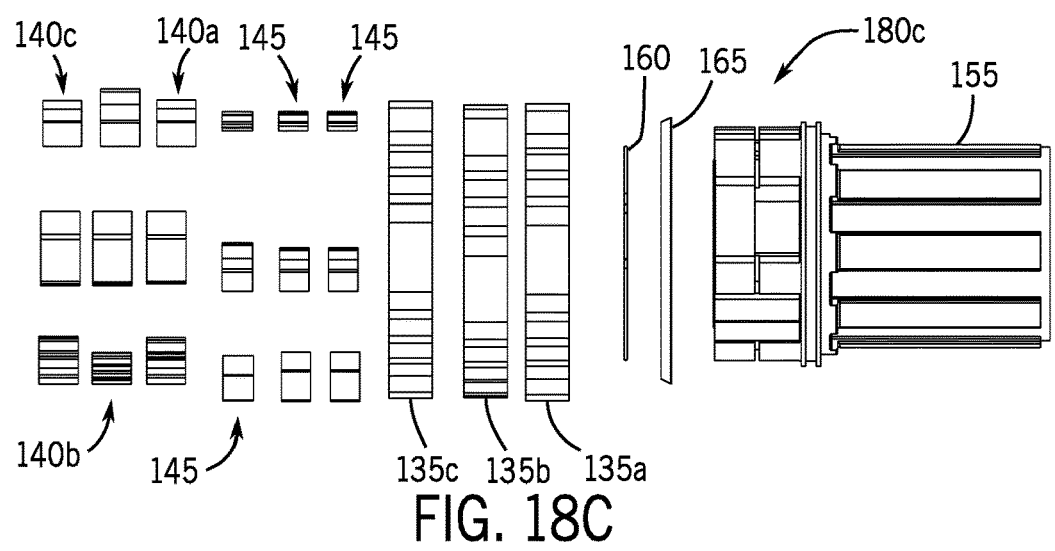
FIG. 18C is a schematic partial exploded side elevation view of a wheel hub assembly for a wheel according to an exemplary embodiment.

As shown schematically according to an exemplary embodiment in FIGS. 2B, 3, 4, 5, 6, 7A-7B, 8A-8D and 9A-9E, the ratchet mechanism 180 of the wheel hub assembly comprises a set of ratchet rings shown as ratchet ring 135a and ratchet ring 135b and with a set of features on the internal perimeter shown as gear teeth 135x configured to engage sets/groups of pawls 140a and pawls 140b (configured in multiple groups/sets). As schematically shown in FIGS. 3, 4, 5, 7A-B, 8A-8D and 14, the pawls (e.g. in sets configured to engage each ratchet ring) are retained by springs shown as pawl springs 145 and separated by a clip shown as pawl divider clip 150 in a set of seats shown as pockets 155a on the free hub body 155; a seal 160 is provided to engage a seal groove 155b on free hub body 155. See also FIGS. 18A-18C (configuration of pawl springs 145 according to an exemplary embodiment). As shown schematically in FIGS. 7B, 9A-9E and 10A-10E; each ratchet ring of the ratchet mechanism provides a set of features/projections on the external perimeter shown as lobes 135k that are engaged/secured on corresponding features within the interior perimeter of the hub shell 125 to install/retain the ratchet rings in the wheel hub assembly. See also FIGS. 16A-16C (showing a variety of configurations of a ratchet ring with external perimeter/lobes to engage the interior of perimeter of a hub shell).

As indicated schematically according to an exemplary embodiment in FIGS. 7A-7B, 8A-8D and 9A-9E, the wheel hub assembly coupling the hub shell/wheel to the free hub body/axle through the ratchet mechanism is configured to provide two states: (1) a power-transmission/forward state to facilitate transmission of power from the free hub body/axle in a forward direction for forward motion/rotation of the wheel (e.g. by mechanical engagement/coupling of the free hub body/axle to the hub shell/wheel at the ratchet mechanism) when the wheel is moved forward (e.g. with power supplied from the drive system to the wheel hub such as from an operator through the pedals and/or motor, etc.) and (2) a free-wheel/glide/coast state to facilitate free rotary motion/rotation of the free hub body/axle relative to the wheel other than in the forward direction (e.g. by mechanical disengagement/decoupling of the axle/free hub body from the hub shell/wheel at the ratchet mechanism) when the wheel hub is moved in a reverse direction or with motion stopped relative to the wheel (e.g. during "coasting" or "free-wheeling" or gliding or slowing or stopping, etc.).

Figure 9A:
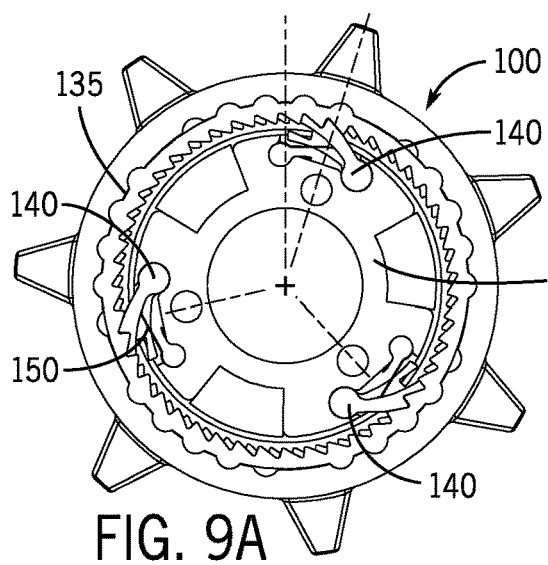
FIGS. 9A through 9E are schematic diagrams of operation of the ratchet mechanism of a wheel hub assembly for a wheel according to an exemplary embodiment.
Figure 9B:
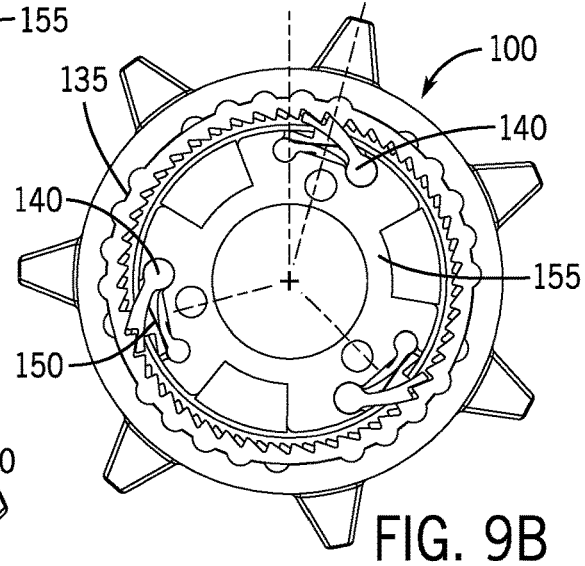
Figure 13A:
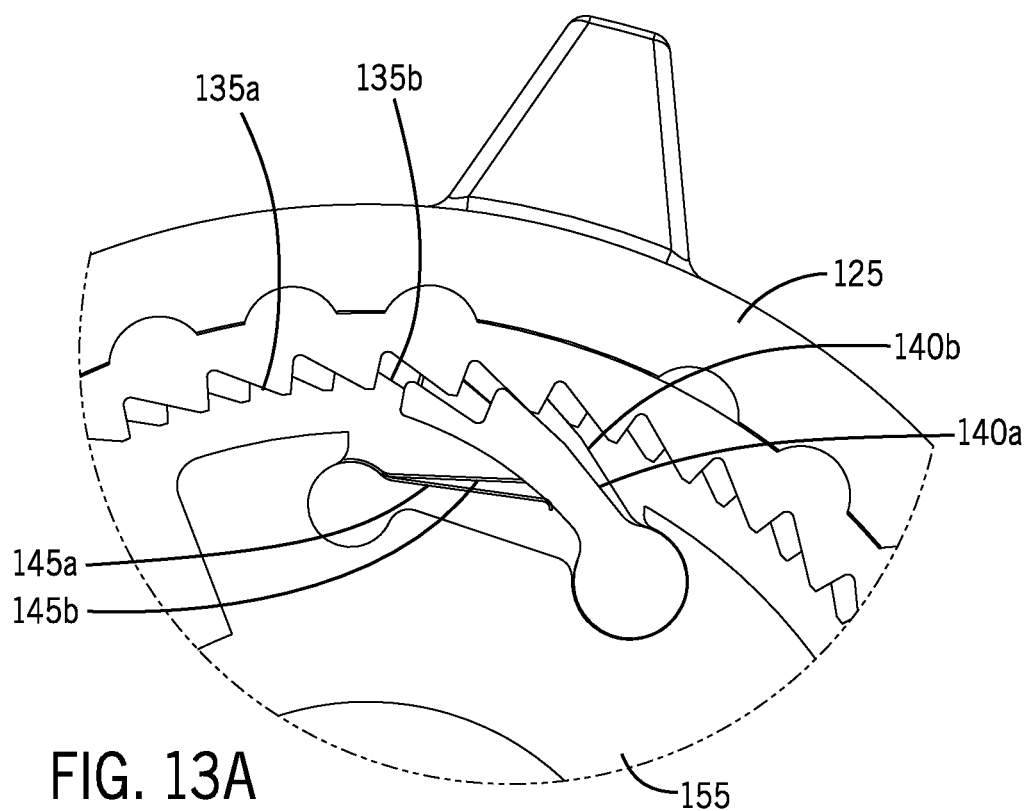
FIGS. 13A and 13B are schematic fragmentary diagrams of operation of the ratchet mechanism of a wheel hub assembly for a wheel according to an exemplary embodiment.
Figure 13B:
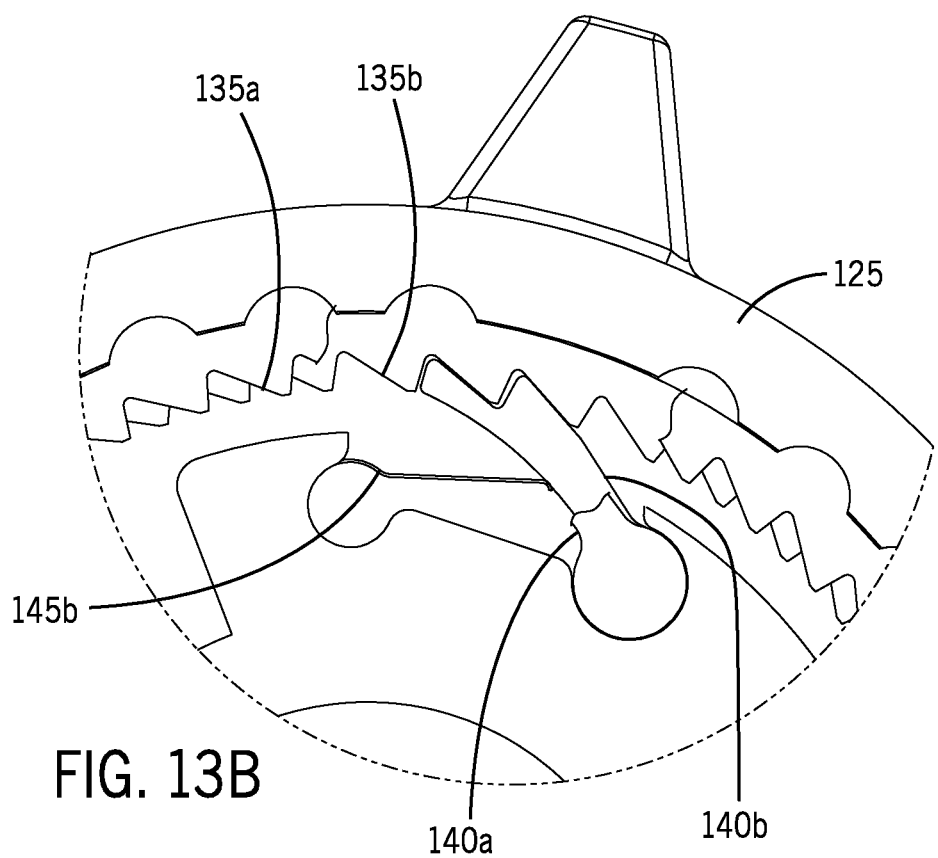
Figure 17A:
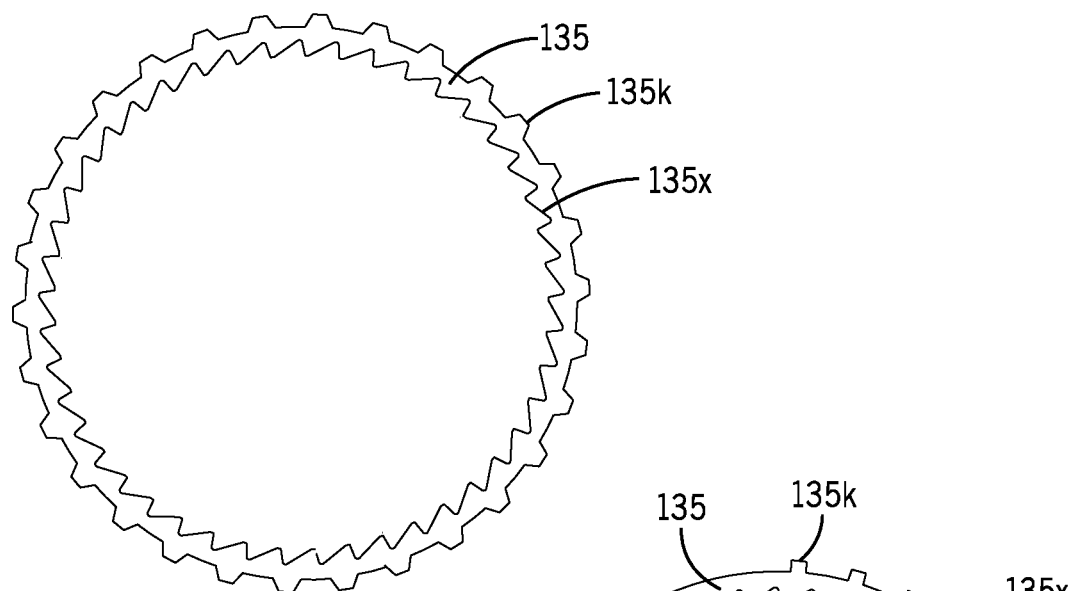
FIGS. 17A through 17C are schematic views of a ratchet ring for a wheel hub assembly for a wheel according to an exemplary embodiment.
Figure 17B:
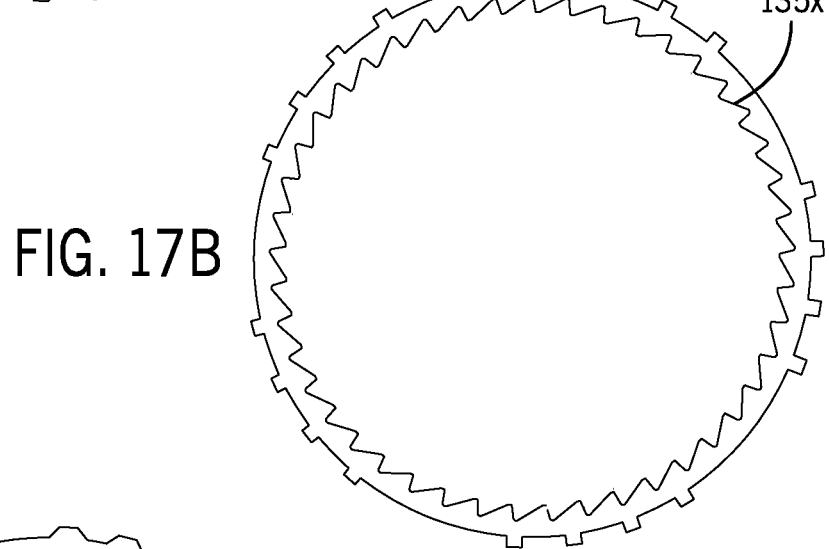
Figure 17C:
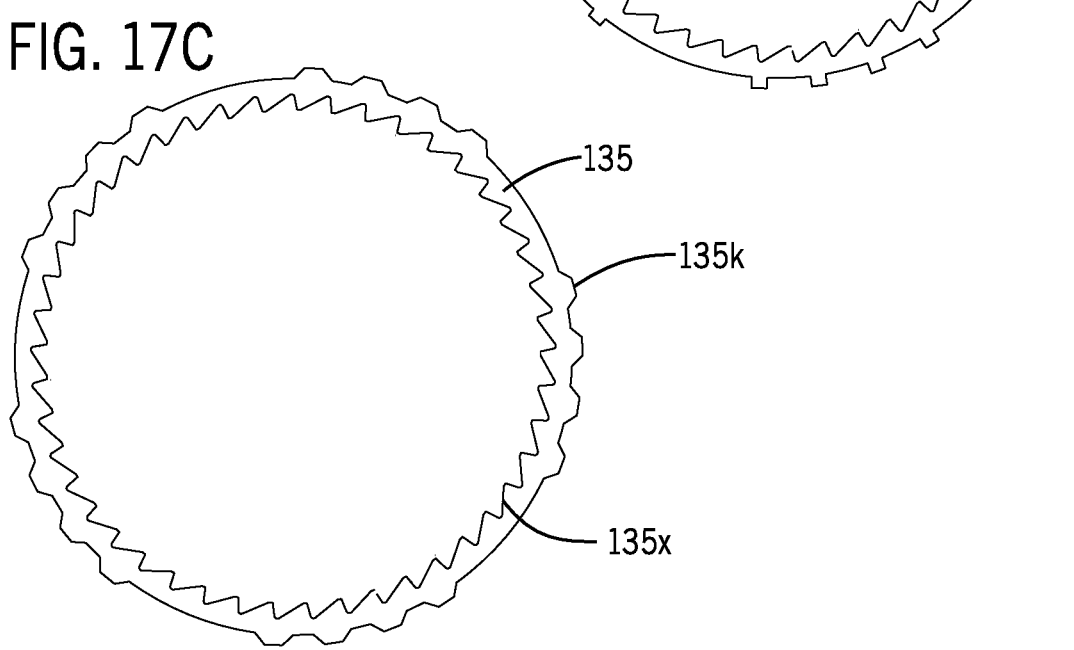

As shown schematically according to an exemplary embodiment in FIGS. 9A-9B, the ratchet ring arrangement for each ratchet ring comprises multiple groups/sets of pawls. As shown schematically according to an exemplary embodiment in FIGS. 2B, 8A-8D, 9A-9E, 10A-10E, 11A-11E and 12B, each pawl is configured with a profile/shape providing surface (e.g. including a ramped/cam surface) configured to engage and disengage with gear teeth of the ratchet ring; as indicated schematically in FIGS. 9A-9E, 10A-10E and 11A-11E, when the axle/free hub body with pawls 140 on pawl springs 145 is rotated in a forward direction (relative to the hub shell/wheel), the cam surface of each pawl is configured to engage the gear teeth of the ratchet ring (and drive/engage the wheel); when the axle/free hub body with pawls 140 is stopped or rotated in an opposite direction (relative to the hub shell/wheel), the cam surface of each pawl is configured to disengage (e.g. "slip" the gears/gear teeth) the gear teeth of the ratchet ring (and decouple/disengage the wheel). As shown schematically in FIGS. 8B-8D, 9A-9E, 10A-10E, 11A-11E, 12B and 16B, each pawl is provided with a base configured to provide a pivot within the seat of free hub body (e.g. lobes/keys to allow pivoting movement for engagement and disengagement under the action of the pawl spring and gear teeth of the ratchet ring during rotation) and a body with a curved cam/surface (to facilitate disengagement from gear teeth of the ratchet ring) and an end profile providing an interface (e.g. seat comprising two teeth to engage/mesh) with the gear teeth on the ratchet ring. See also FIGS. 4 and 13A-13B.

As shown schematically in FIGS. 6, 7A-7B and 8A-8B, when the wheel hub assembly is assembled each pawl 140 of each set/group of pawls is configured under action of a pawl spring 145 to be engaged with the gear teeth 135x of the ratchet ring 135 and retained in engagement during rotation of the free hub/axle relative to the hub shell in the forward direction (e.g. for power supplied from the drive system to the wheel hub) (see also FIGS. 12A-12B); each pawl 140 of each set of pawls is disengaged from gear teeth 135x of the ratchet ring 135 to during rotation of the free hub body/axle relative to the hub shell in the reverse direction (e.g. decoupled for gliding, free-wheeling, coasting, etc.). See also FIGS. 15A-15C and 16A-16B.

According to an exemplary embodiment of a bicycle as indicated schematically in FIG. 1, in typical use the operator/rider of the bicycle will transition the rear wheel/wheel hub assembly between the power-transmission state and the free-wheel state (e.g. while applying power such as by pedaling, etc.); in operation of the bicycle, the operator/rider may desire that the wheel hub assembly transition between states responsively and rapidly (e.g. depending upon route, terrain, conditions, preferences, etc.).

According to an exemplary embodiment shown schematically in FIGS. 3, 4, 7A and 9A-9E, the wheel hub assembly comprises a ratchet mechanism configured to provide enhanced responsiveness in transition to the power-transmission state (e.g. transition to forward pedaling, shifting, acceleration, etc.) with enhanced efficiency/ease in transition to the free-wheel state (e.g. coasting, backward pedaling, etc.). Enhanced responsiveness in transition (and evenness) may be achieved by providing a ratchet mechanism that has enhanced precision in engagement; enhanced precision in engagement may be provided a reduction in the number of degrees of rotation of the free hub body in free travel in the forward direction before the completed transition from the free-wheel state to the power-transmission state; the number of degrees of rotation of the free hub body/axle in free travel (in the forward state) before the completed transition to the power-transmission state may be determined by the number of effective gear teeth in the ratchet ring arrangement (e.g. the number of gear teeth configured to be engaged by a pawl) in a cycle of rotation. See TABLE A. As indicated in FIGS. 9A-9E, 11A-11E, 12A-12B, 15C-15C and 16A-16B, the number of effective gear teeth engaged in the ratchet ring arrangement may also be determined by the number and configuration of ratchet rings (e.g. offset and/or alignment for ratchet rings, etc.); providing multiple ratchet rings in an offset arrangement in the ratchet mechanism (with a corresponding group/set of pawls) will increase the number of effect gear teeth engaged in a cycle of rotation. See TABLE A.

As indicated schematically in FIGS. 9A-9E and 10A-10E, in operation of the ratchet mechanism the free hub body/axle is configured to rotate relative to the hub shell/wheel to produce a series of engagement states (e.g. providing for power-transmission state through the wheel hub assembly) and a series of disengagement states (e.g. providing the free-wheel state at the wheel hub assembly); with the ratchet mechanism in the engagement state (e.g. during power-transmission/drive in the forward direction) the free hub body/axle and hub shell/wheel are driven/rotate together; with the ratchet mechanism in the disengagement state (e.g. during glide/free-wheeling) the free hub body/axle and hub shell/wheel may rotate independently (e.g. wheel may rotate forward while axle rotates in opposite direction remains stationary, wheel may be stationary while axle rotates in backward direction, etc.) until re-engaged at the ratchet mechanism (e.g. by driven forward rotation of free wheel hub/axle to engage hub shell/wheel).

As indicated schematically according to an exemplary embodiment in FIGS. 3, 4, 8A-8D, 9A-9E, 11A-11E and 12A-12B, the ratchet mechanism provides a ratchet ring arrangement providing a set of ratchet rings comprising an outer/first ring 135a and an inner/second ring 135b that each provide a set of gear teeth 135x (e.g. shown as 45 total for each ratchet ring with engagement of the sets of pawls in corresponding gear teeth every 8 degrees of rotation in the 360 degree cycle). See also TABLE A.

According to an exemplary embodiment, the ratchet ring arrangement of the wheel hub can be configured with each ratchet ring in alignment and so that the number of effective gear teeth is 45 total (for the combined ratchet ring arrangement of two aligned ratchet rings) with 8 degrees of forward rotation during transition from the free-wheel state to the power-transmission state (e.g. with the sets of pawls of both ratchet rings engaged together/simultaneously); in the power-transmission state, load from power input to the wheel hub is carried by both ratchet ring arrangements (e.g. with the sets of pawls engaged for each ratchet ring); the configuration provides for more even load distribution in the ratchet ring arrangement (e.g. reduced concentration of loading/stress on gear teeth/pawls at the ratchet mechanism) and for greater likelihood of enhanced durability of the wheel hub assembly in operation. See also TABLE A.

According to an exemplary embodiment, the ratchet ring arrangement of the wheel hub assembly can be configured with each ratchet ring in an offset so that the number of effective gear teeth is 90 total (for the combined ratchet ring arrangement of two offset ratchet rings) with 4 degrees of forward rotation (at most) during transition from the free-wheel state to the power-transmission state (e.g. with the sets of pawls of each individual ratchet rings engaged independently/separately); in the power-transmission state, load from power input to the wheel hub is carried one ratchet ring arrangement (e.g. by one of the sets of pawls for one individual ratchet ring with only one ratchet ring arrangement is engaged while the other ratchet ring engagement is disengaged); the configuration provides for a more rapid/responsive engagement during the transition from the free-wheel state to the power-transmission state (e.g. engagement within 4 degrees of rotation). See FIGS. 9A-9E, 11A-11E and 12A-12B. See also TABLE A.

Figure 9C:
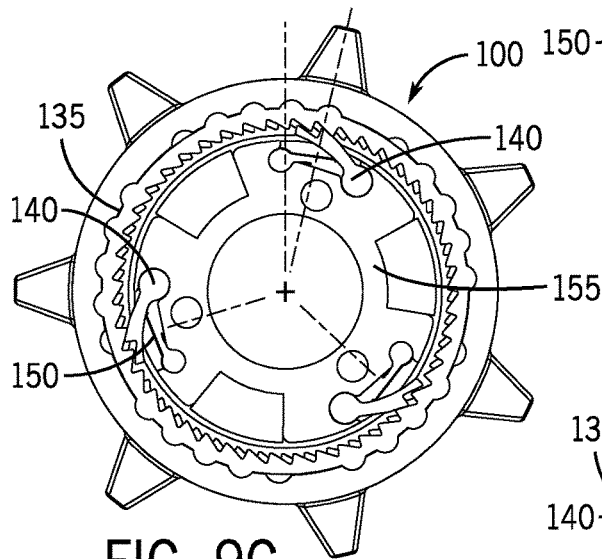
Figure 9D:
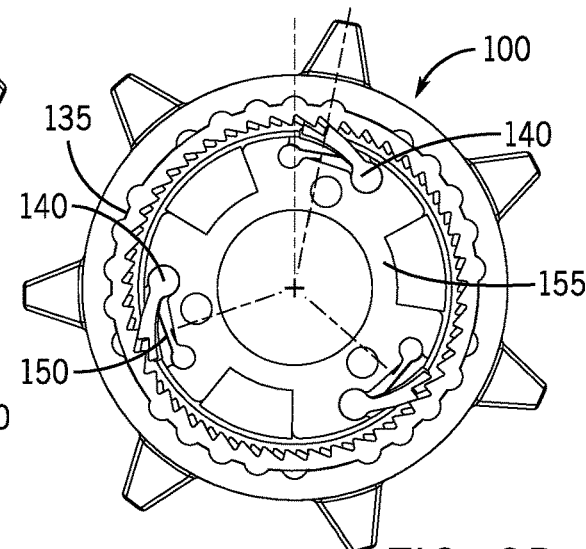
Figure 9E:
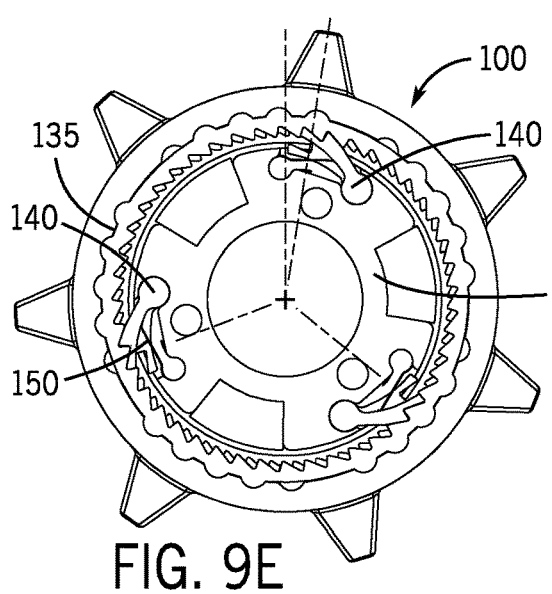
Figure 10A:
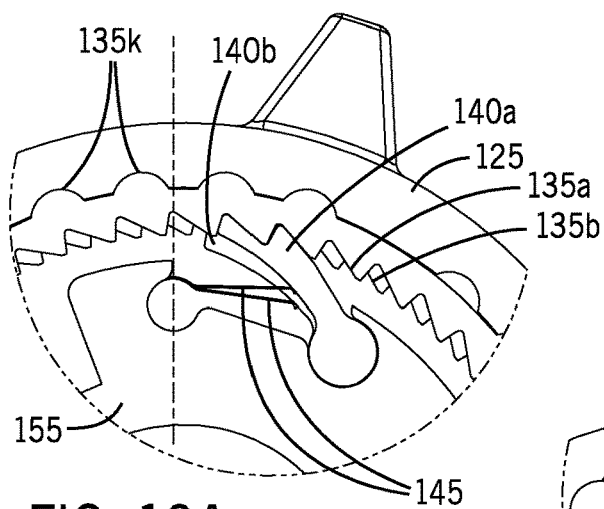
FIGS. 10A through 10E are schematic fragmentary diagrams of operation of the ratchet mechanism of a wheel hub assembly for a wheel according to an exemplary embodiment.
Figure 10B:
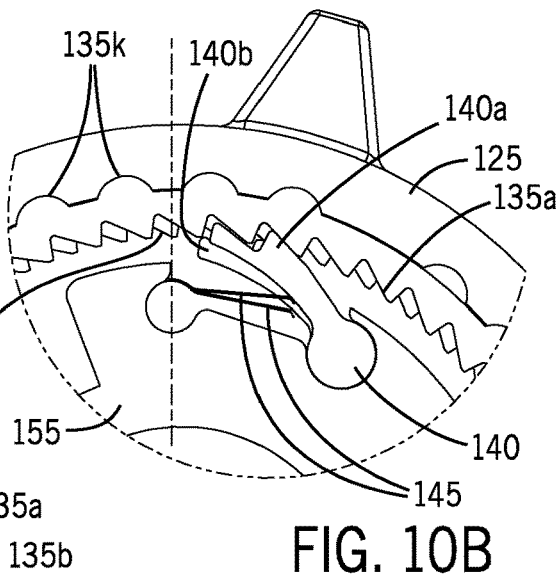
Figure 10C:
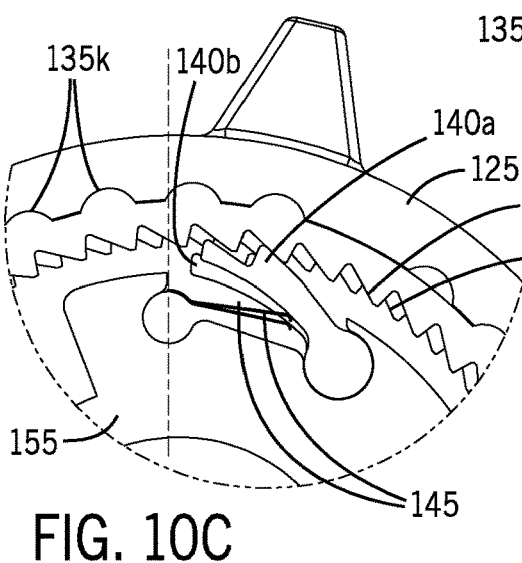
Figure 10D:
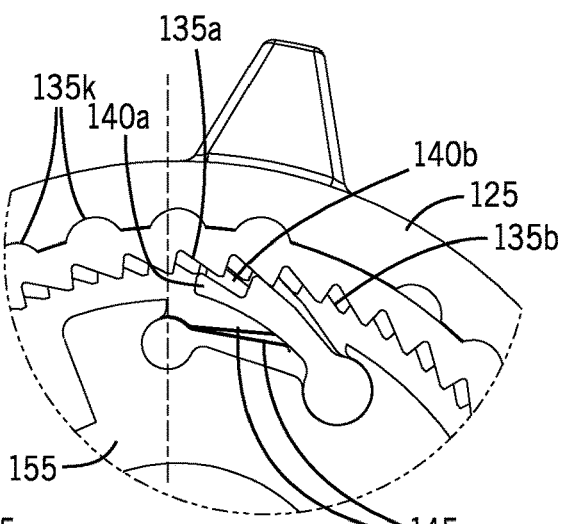
Figure 10E:
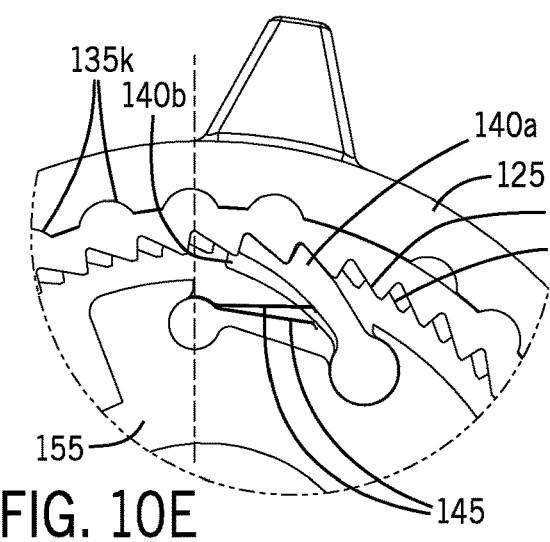

As shown schematically according to an exemplary embodiment in FIGS. 9A-9E and 11A-11E, a sequence of engagement/disengagement of the ratchet mechanism for the wheel hub assembly having a set of two ratchet rings (e.g. with gear teeth/pawls having the indicated corresponding shape/profile) is shown in operation with the set of pawls for one set of ratchet rings engaged (FIGS. 9A and 11A) and then with the set of pawls for both sets of ratchet rings disengaged (FIGS. 9B and 11B) and then with the set of pawls for the other set of ratchet rings engaged (e.g. with engagement of pawl 140b with teeth 135x of ring 135b as shown in FIGS. 9C and 11C) and then with the set of pawls for both sets of ratchet rings disengaged (FIGS. 9B and 11B) and then with the set of pawls for the other set of ratchet rings engaged (e.g. with engagement of pawl 140a with teeth 135x of ring 135a as shown in (FIGS. 9C and 11C). See also FIGS. 15A-15C.

As indicated schematically, the ratchet ring arrangement of the ratchet mechanism may comprise a variety of engagement/gear configurations (e.g. number of gear teeth, shape of gear teeth, etc.) and/or a variety of pawl/pawl set (e.g. number of pawls, number of sets of pawls, shape of pawls, etc.) configurations and/or with a variety of ratchet ring configurations (e.g. number of ratchet rings, shape of lobes/engagement with hub shell, etc.). See generally FIGS. 2B, 4, 7A-7B, 8A-8D, 9A-9E, 14, 15A-15C and 17A-17C. See also TABLE A. For example, a configuration with fewer gear teeth may allow for larger gears and greater durability/strength; a configuration with multiple pawls/pawl sets may allow for wider load distribution within the ratchet mechanism; a configuration with multiple offset ratchet rings may allow for improved responsiveness (e.g. more rapid transition to the power-transmission state within fewer degrees of rotation); a configuration with multiple aligned ratchet rings may allow for greater durability/strength and wider load distribution within the ratchet mechanism. As indicated generally, according to an exemplary embodiment the ratchet mechanism of the wheel hub assembly may be configured for performance in any of variety of wide applications, including road biking, mountain biking, electronic bikes (e.g. with motor-driven drive system), etc. See generally FIGS. 1, 2A-2B, 4, 6, 9A-9E, 14, 15A-15C, 16A-16B and 17A-17C.

As shown according to an exemplary embodiment in FIGS. 4 and 9A-9E, the ratchet mechanism 180 may comprise a configuration with two ratchet rings and three sets of pawls for each ratchet ring; as indicated the ratchet rings may be offset/aligned as desired to provide a configuration to provide enhanced strength durability, wider/more even load distribution, enhanced responsiveness in transition to the power-transmission state (e.g. within 4 to 8 degrees of forward rotation), etc. As shown according to an exemplary embodiment in FIGS. 14, 15A-15C and 16A-16B, the ratchet mechanism may comprise a configuration with three ratchet rings and three sets of pawls with each ratchet ring; as indicated the ratchet rings may be offset/aligned as desired to provide a configuration to provide enhanced strength durability, wider load distribution, enhanced responsiveness in transition to the power-transmission state (e.g. within less than 2 to more than 8 degrees of forward rotation), etc. See also TABLE A.

According to an exemplary embodiment, the inner perimeter of the hub shell can be configured to seat/secure a ratchet ring or set of ratchet rings in a variety of arrangements including with aligned or offset (e.g. with gear teeth in alignment or offset) and/or to accommodate a variety of different ratchet rings. See for example FIGS. 2A-2B, 7A-7B, 12A-12B, 16A-16B and 17A-17B.

As shown schematically according to an exemplary embodiment in TABLE A and in FIGS. 4, 5, 6, 9A-9E, 11A-11E, 12A-12B, 13A-13B, 14 and 15A-15B, the wheel hub assembly is provided in a compact form to allow configuration in a variety of arrangements which can accommodate or provide a variety of different ratchet mechanism configurations (e.g. ratchet ring/pawl combinations with alignment/offset of ratchet rings, etc. providing variations in the number of effective gear teeth to be engaged, degree of rotation before engagement, etc.).

TABLE A

EXAMPLE RATCHET MECHANISM (RATCHET RING/PAWL SET) ARRANGEMENTS/CONFIGURATIONS FOR WHEEL HUB ASSEMBLY

| NUMBER OF RATCHET RING(S) | NUMBER OF GEAR TEETH ON RATCHET RING | GEAR TEETH ALIGNED OR OFFSET (RATCHET RINGS) | NUMBER OF-SETS/ GROUPS OF PAWLS FOR ENGAGEMENT | MAXIMUM FORWARD ROTATION BEFORE ENGAGEMENT (DEGREES) |
| --- | --- | --- | --- | --- |
| 1 | 45 | N/A | 3 | 8 |
| 2 | 45 | aligned | 3 | 8 |
| 2 | 45 | offset | 3 | 4 |
| 2 | 24 | offset | 3 | 7.5 |
| 2 | 30 | offset | 3 | 6 |
| 2 | 36 | offset | 3 | 5 |
| 2 | 48 | offset | 3 | 3.75 |
| 2 | 48 | offset | 4 | 3.75 |
| 2 | 60 | offset | 3 | 3 |
| 2 | 60 | offset | 4 | 3 |
| 3 | 45 | offset | 3 | 2 |
| 3 | 45 | aligned | 3 | 8 |
| 3 | 24 | offset | 3 | 3.75 |
| 3 | 30 | offset | 3 | 3 |
| 3 | 36 | offset | 3 | 2.5 |
| 3 | 48 | offset | 3 | 1.875 |
| 3 | 48 | offset | 4 | 1.875 |
| 3 | 60 | offset | 3 | 1.5 |
| 3 | 60 | offset | 4 | 1.5 |

According to an exemplary embodiment as indicated schematically in FIGS. 2A-2B, 9A-9E, 11A-11E and 15A-15C, an improved wheel hub assembly may comprise a hub shell for a wheel and coupled to a hub body with an axle by a ratchet mechanism and configured to provide a power-transmission/engaged state where the hub body/axle and the hub shell/wheel rotate together and a free-wheel/disengaged state where the hub body/axle may rotate independently relative to hub shell/wheel; the ratchet mechanism may comprise a set of ratchet rings configured with a set of teeth and a sets/groups of pawls configured to engage/disengage the teeth of a ratchet ring; the ratchet rings may be configured/installed in the hub body in an aligned condition or an offset condition; when the ratchet rings are configured in an offset condition the ratchet mechanism may be configured to facilitate a generally more responsive/efficient transition between the disengaged state and the engaged state for the hub body/axle and hub shell/wheel. See TABLE A.

As indicated schematically according to an exemplary embodiment, the wheel hub assembly may comprise a hub shell for a wheel and coupled to a hub body with an axle by a ratchet mechanism and configured to provide an engaged state where the hub body/axle and the hub shell/wheel rotate together and a disengaged state where the hub body/axle may rotate independently relative to hub shell/wheel; the ratchet mechanism may comprise a set of ratchet rings configured with a set of teeth and a sets/groups of pawls configured to engage/disengage the teeth of a ratchet ring; the ratchet rings may be configured/installed in the hub body in an aligned condition or an offset condition; when the ratchet rings are configured in an offset condition the ratchet mechanism may be configured to facilitate a generally more responsive transition between the disengaged state and the engaged state for the hub body/axle and hub shell/wheel. The wheel hub assembly may comprise a hub shell/wheel and a free hub body/axle coupled by a ratchet mechanism comprising at least one ratchet ring with gear teeth configured to engage a corresponding set/group of pawls so that the wheel and hub body/axle may engage in a power-transmission state such as for forward driven movement; the ratchet mechanism with ratchet rings/pawls may disengage in a free-wheel state. The ratchet mechanism may comprise a ratchet ring arrangement with multiple sets of ratchet rings; with each ratchet ring in offset the number of effective gear teeth per cycle of rotation of the ratchet ring arrangement is greater than the number of gear teeth on each separate ratchet ring; the number of effective gear teeth able to be engaged (e.g. by pawls having a shape/profile to engage from one direction and disengage from one direction with gear teeth during rotation) provides variation of performance characteristics for the wheel hub assembly. For example, a configuration with fewer effective gear teeth may allow for larger gears and greater durability/strength; a configuration with multiple pawls/pawl sets may allow for wider load distribution within the ratchet mechanism; a configuration with multiple offset ratchet rings may allow for improved responsiveness (e.g. more rapid transition to the power-transmission state within fewer degrees of rotation); a configuration with multiple aligned ratchet rings may allow for greater durability/strength and wider load distribution within the ratchet mechanism.

As indicated schematically according to an exemplary embodiment, the pawl system/pawl arrangement may comprise adjacent sets of pawls configured in an aligned condition for engagement with the ratchet ring arrangement; the ratchet mechanism/ratchet ring arrangement may comprise adjacent sets of ratchet rings configured in an aligned condition for engagement with the pawl system. As indicated schematically according to an exemplary embodiment, the pawl system/pawl arrangement may comprise a profile and the ratchet mechanism/ratchet ring arrangement may comprise a profile to provide an interface for the hub shell and hub body; the profile of the pawl system may be configured to mate with the profile of the ratchet ring arrangement to that the profile of the pawls fits with the profile of gear teeth of the ratchet ring arrangement.

According to an exemplary embodiment, the ratchet mechanism of the wheel hub assembly may be configured for performance in any of a wide variety of applications, including road biking, mountain biking, electronic bikes (e.g. with motor-driven drive system). The wheel hub assembly is provided in a compact form/design to allow configuration in a variety of arrangements which can accommodated a variety of different ratchet mechanism configurations (e.g. ratchet ring/pawl combinations).

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A hub assembly for a wheel comprising:
   a hub shell coupled to the wheel;
   a hub body configured for an axle;
   wherein the hub shell is coupled to the hub body by a ratchet mechanism;
   wherein the ratchet mechanism comprises a ratchet ring arrangement and a pawl system;
   wherein rotation of the hub shell comprises (a) rotation with engagement with the hub body when the pawl system is engaged with the ratchet ring arrangement and (b) rotation without engagement with the hub body when the pawl system is disengaged from the ratchet ring arrangement;

wherein maximum rotation of the hub shell before engagement of the hub body is a configured to be determined by at least one of (a) a number of ratchet rings in the ratchet ring arrangement; (b) a number of gear teeth of each ratchet ring of the ratchet ring arrangement; (c) whether gear teeth of each ratchet ring of the ratchet ring arrangement are in an aligned condition or an offset condition; (d) a number of sets of pawls of the pawl system for engagement with a gear teeth of a ratchet ring in the ratchet ring arrangement.

2. The assembly of claim 1 wherein the pawl system comprises multiple sets of pawls configured to engage the ratchet ring arrangement.

3. The assembly of claim 2 wherein the pawl system comprises adjacent sets of pawls configured in an aligned condition for engagement with the ratchet ring arrangement.

4. The assembly of claim 3 wherein in the offset condition maximum rotation before engagement of the hub shell with the hub body is reduced in comparison with the aligned condition.

5. The assembly of claim 4 wherein each of the multiple sets of ratchet rings is configured to engage a set of pawls of the pawl system.

6. The assembly of claim 2 wherein the ratchet ring arrangement comprises adjacent ratchet rings configured for engagement with the pawl system; wherein the ratchet ring arrangement is in the aligned condition when gear teeth of adjacent ratchet rings of the ratchet ring arrangement are in alignment; wherein the ratchet ring arrangement is in the offset condition when gear teeth of adjacent ratchet rings of the ratchet ring arrangement are offset.

7. The assembly of claim 1 wherein the ratchet ring arrangement comprises multiple sets of ratchet rings; wherein with each ratchet ring in an offset condition a number of effective gear teeth per cycle of rotation of each ratchet ring arrangement is greater than the number of gear teeth of each ratchet ring; wherein variation of the number of effective gear teeth engaged provides variation of performance characteristics at the wheel.

8. A hub assembly for a wheel comprising:
a hub shell coupled to the wheel;
a hub body configured for an axle;
wherein the hub shell is coupled to the hub body by a ratchet mechanism;
wherein the ratchet mechanism is configured to provide an engaged state where the hub body with the axle is configured to rotate together with the hub shell with the wheel;
wherein the ratchet mechanism is configured to provide a disengaged state where the hub body with the axle is configured to rotate independently relative to the hub shell with the wheel;
wherein the ratchet mechanism comprises a set of pawls and a set of ratchet rings comprising a set of teeth;
wherein in the engaged state for a ratchet ring a set of teeth is configured to engage a set of pawls;
wherein the engaged state comprises a power-transmission state configured for transmission of power to the wheel; and the disengaged state comprises a free-wheel state.

9. The assembly of claim 8 wherein the set of ratchet rings may be configured to be installed in the hub body in an aligned condition or an offset condition.

10. The assembly of claim 8 wherein when the ratchet rings are configured in an offset condition the ratchet mechanism is configured to facilitate a generally more responsive transition between the disengaged state and the engaged state.

11. The assembly of claim 8 wherein the set of ratchet rings comprises multiple sets of ratchet rings; wherein with each ratchet ring in the set of ratchet rings in an offset condition a number of effective gear teeth per cycle of rotation of each ratchet ring arrangement is greater than the number of gear teeth on each separate ratchet ring.

12. A hub assembly for a wheel comprising:
a hub shell coupled to the wheel;
a hub body configured for an axle;
wherein the hub shell is coupled to the hub body by a ratchet mechanism;
wherein the ratchet mechanism comprises a ratchet ring system and a pawl system;
wherein the pawl system is configured for engagement with the ratchet ring system;
wherein rotation of the hub shell comprises (a) rotation with engagement with the hub body and (b) rotation without engagement with the hub body.
wherein the ratchet ring system comprises adjacent ratchet rings configured for engagement with the pawl system;
wherein the ratchet ring system is in an aligned condition when gear teeth of adjacent ratchet rings of the ratchet ring system are in alignment;
wherein the ratchet ring system is in an offset condition when gear teeth of adjacent ratchet rings of the ratchet ring system are offset.

13. The assembly of claim 12 wherein when the ratchet mechanism is in the offset condition maximum rotation before engagement of the hub shell with the hub body is reduced in comparison with the aligned condition.

14. The assembly of claim 12 wherein the pawl system comprises a number of sets of pawls for engagement with a ratchet ring of the ratchet ring system.

15. The assembly of claim 12 wherein rotation of the hub shell comprises (a) rotation with engagement with the hub body when the pawl system is engaged with the ratchet ring system and (b) rotation without engagement with the hub body when the pawl system is disengaged from the ratchet ring system.

16. The assembly of claim 12 wherein maximum rotation of the hub shell before engagement of the hub body is a product of at least one of (a) a number of ratchet rings; (b) a number of gear teeth of each ratchet ring; (c) whether gear teeth of each ratchet ring are in an aligned condition or an offset condition; (d) a number of sets of pawls for engagement with a gear teeth of a ratchet ring.

17. The assembly of claim 12 wherein the ratchet mechanism comprises an interface between the hub shell and the hub body; wherein the interface is configured for an engaged state and a disengaged state; the interface is configured for maximum rotation between the disengaged state and the engaged state; wherein in the engaged state a set of ratchet rings of the ratchet ring system is engaged with a set of pawls of the pawl system.

18. The assembly of claim 17 wherein the interface comprises the profile of pawls of the pawl system for engagement with the ratchet ring system.

19. The assembly of claim 17 wherein the interface comprises a number of sets of pawls for engagement with gear teeth within the ratchet mechanism.

20. The assembly of claim 17 wherein the interface comprises mating surfaces of a ratchet ring of the ratchet mechanism with an inner surface of the hub shell.

\* \* \* \* \*